(12) United States Patent
Sozzani et al.

(10) Patent No.: US 10,371,320 B2
(45) Date of Patent: Aug. 6, 2019

(54) COVALENT ORGANIC FRAMEWORK NANOPOROUS MATERIALS FOR HIGH PRESSURE GAS STORAGE

(71) Applicant: BLUE WAVE CO S.A., Luxembourg (LU)

(72) Inventors: Piero Sozzani, Milan (IT); Angiolina Comotti, Milan (IT); Silvia Bracco, Milan (IT)

(73) Assignee: BLUE WAVE CO S.A., Luxembourg (LU)

(*) Notice: Subject to any disclaimer, the term of this patent is extended or adjusted under 35 U.S.C. 154(b) by 0 days.

(21) Appl. No.: 15/532,047

(22) PCT Filed: Dec. 1, 2015

(86) PCT No.: PCT/EP2015/078258
§ 371 (c)(1),
(2) Date: May 31, 2017

(87) PCT Pub. No.: WO2016/087471
PCT Pub. Date: Jun. 9, 2016

(65) Prior Publication Data
US 2017/0314737 A1    Nov. 2, 2017

(30) Foreign Application Priority Data
Dec. 1, 2014  (GB) .................................. 1421328.4

(51) Int. Cl.
*C10L 3/06* (2006.01)
*F17C 5/06* (2006.01)
(Continued)

(52) U.S. Cl.
CPC .......... *F17C 11/007* (2013.01); *B01J 20/226* (2013.01); *B01J 20/267* (2013.01); *B01J 20/2808* (2013.01); *B01J 20/28064* (2013.01); *B01J 20/28066* (2013.01); *B01J 20/28073* (2013.01); *B01J 20/28076* (2013.01);
(Continued)

(58) Field of Classification Search
CPC .......... F17C 11/007; F17C 5/06; F17C 11/00; F17C 2270/0102; F17C 2221/033; F17C 2221/013; B01J 20/3085; B01J 20/28064; B01J 20/28076; B01J 20/226; B01J 20/2808; B01J 20/28066; B01J 20/267;
(Continued)

(56) References Cited

U.S. PATENT DOCUMENTS

2012/0270731 A1* 10/2012 Gaab .................. B01J 20/267
502/402

* cited by examiner

*Primary Examiner* — Jason K Niesz
(74) *Attorney, Agent, or Firm* — Squire Patton Boggs (US) LLP

(57) ABSTRACT

A method of storing gas comprises providing a recipient for receiving the gas and providing a porous gas storage material. The gas storage material comprises a cross-linked polymeric framework and a plurality of pores for gas sorption. The cross-linked polymeric framework comprises aromatic ring-containing monomeric units comprising at least two aromatic rings. The aromatic ring-containing monomeric units are linked by covalent cross-linking between aromatic rings to form a stable, rigid nanoporous material for storing the gas at pressures significantly greater than the atmospheric pressure, for example in excess of 100 bar. A possible application is the storage and transportation of compressed natural gas.

7 Claims, 12 Drawing Sheets

(51) Int. Cl.
*F17C 11/00* (2006.01)
*B01J 20/22* (2006.01)
*B01J 20/26* (2006.01)
*B01J 20/28* (2006.01)
*B01J 20/30* (2006.01)
*C08F 132/06* (2006.01)
*C08F 132/08* (2006.01)
*C08G 61/12* (2006.01)
*C08G 77/04* (2006.01)

(52) U.S. Cl.
CPC ......... *B01J 20/3085* (2013.01); *C08F 132/06* (2013.01); *C08F 132/08* (2013.01); *C08G 61/124* (2013.01); *C08G 77/04* (2013.01); *C10L 3/06* (2013.01); *F17C 5/06* (2013.01); *F17C 11/00* (2013.01); *F17C 2221/013* (2013.01); *F17C 2221/033* (2013.01); *F17C 2270/0102* (2013.01)

(58) Field of Classification Search
CPC .... C08F 132/08; C08F 132/06; C08G 61/124; C08G 77/04; C10L 3/06
See application file for complete search history.

COVALENT ORGANIC FRAMEWORK NANOPOROUS MATERIALS FOR HIGH PRESSURE GAS STORAGE

FIELD

This invention relates to gas storage materials and methods for their production as well as methods for storing gas. In particular, this invention relates to methods for storing gas on a transportation means, so that the stored gas can be transported on the transportation means from a first location to a second location. More particularly, this invention relates to materials and methods for storing, and/or for storing and transporting, gas comprising, or rich of, carbon dioxide ($CO_2$); and/or, methane ($CH_4$). More particularly, this invention relates to materials and methods for storage, and/or for storage and transportation, of compressed $CO_2$, or of compressed natural gas (CNG). More particularly, the present invention relates to marine storage and transportation of CNG.

BACKGROUND

The need for alternative fuels is greater now than ever before. As a readily available option with a low pollution factor, natural gas is a viable choice. However, currently available natural gas transportation methods, such as pipelines and liquid natural gas (LNG), may prove unsatisfactory and/or uneconomic. This is particularly the case for "stranded" gas reservoirs. In these stranded gas reservoirs, which are often located off-shore, natural gas is present in quantities which typically do not justify capital-intensive infrastructural investment, such as that necessary to build new pipelines and/or liquefaction/regasification facilities. There is, therefore, an attractive business case for CNG, and especially for marine CNG. In CNG applications, whether terrestrial or marine, natural gas is simply compressed for containment and transportation inside appropriate CNG containment systems. In marine CNG applications, the CNG containment systems are provided onboard ships, barges or other water-going vessels. CNG containment systems, water-going vessels for marine CNG and various CNG related technical aspects are described in patent applications: PCT/EP2011/071782; PCT/EP2011/071786; PCT/EP2011/071788; PCT/EP2011/071789; PCT/EP2011/071790; PCT/EP2011/071791; PCT/EP2011/071792; PCT/EP2011/071793; PCT/EP2011/071794; PCT/EP2011/071795; PCT/EP2011/071796; PCT/EP2011/071797; PCT/EP2011/071798; PCT/EP2011/071799; PCT/EP2011/071800; PCT/EP2011/071801; PCT/EP2011/071802; PCT/EP2011/071803; PCT/EP2011/071804; PCT/EP2011/071805; PCT/EP2011/071806; PCT/EP2011/071807; PCT/EP2011/071808; PCT/EP2011/071809; PCT/EP2011/071810; PCT/EP2011/071811; PCT/EP2011/071812; PCT/EP2011/071813; PCT/EP2011/071814; PCT/EP2011/071815; PCT/EP2011/071816; PCT/EP2011/071817; PCT/EP2011/071818; PCT/EP2012/074556; PCT/EP2011/074557; PCT/EP2011/074558; PCT/EP2011/074559; PCT/EP2011/074560; PCT/EP2011/074561; PCT/EP2011/074562; PCT/EP2011/074563; PCT/EP2012/074564; PCT/EP2012/074568; PCT/EP2012/074569; PCT/EP2012/074571; PCT/EP2011/074572; PCT/EP2011/074573; PCT/EP2011/074574; PCT/EP2012/074575; PCT/EP2012/074577; PCT/EP2011/074578; PCT/EP2011/074579; and PCT/EP2012/074580, the content of which is herein fully incorporated by reference.

Storage of natural gas in highly porous materials (also known as adsorbed natural gas or ANG) has already been proposed and studied, but there remain limitations intrinsic with the existing materials used for this purpose. Such materials include the widely described zeolites, metal organic frameworks (MOFs), porous coordination polymers (PCPs) and, in general, metal organic compounds. In existing metal-organic compounds, positively charged metal atoms bound to organic ligands are extremely sensitive to polar substances, such as water, which may contaminate and degrade the operating material during its life-time. Water contamination is also a problem in compounds containing open metal sites, due to the easy deactivation of the porous material. Further, most metal-containing materials achieve a most effective uptake at relatively low pressures. Moreover, uptake measurements in studies are frequently limited to the range below 40 bar. Pressure ranges below 40 bar, or even below 100 bar, are likely to be insufficient, at least in connection with certain CNG storage/transportation projects.

There is also a general desire to store/transport, with respect to the prior art: (a) comparatively more gas per unit of available storage/transportation volume at a given pressure; and/or (b) a same quantity of gas per unit of available storage/transportation volume at a comparatively lower pressure, thereby allowing less material to be used in an associated recipient for storing and/or transporting the gas, e.g. by decreasing a wall thickness of the recipient; and/or (c) a same quantity of gas at a given pressure, using less storage/transportation volume, thereby reducing an overall size of an associated recipient or of the storage/transport system. These objectives, as it will readily be appreciated, are valid for any to-be-stored and/or transported gas, including, but not limited to, CNG. Accordingly, there is a need for a porous material for high pressure storage of gas, such as CNG, compressed $CO_2$, or other compressed gas, that brings forward an improved gas uptake performance, at least at relatively high pressures, compared to the porous materials for high pressure storage of gas described in the prior art.

SUMMARY OF THE INVENTION

The present invention provides materials and methods for gas storage in a high pressure range, overcoming at least some of the restrictions connected with the materials proposed up to now for the above-mentioned purposes. This is useful for a wide-scope of applications. The invention is based on high-surface-area porous materials. This is achieved using a porous gas storage material comprising a cross-linked polymeric framework.

According to a first aspect of this invention, there is provided a method of storing gas comprising:
  providing a recipient for receiving the gas;
  providing a porous gas storage material, the gas storage material comprising:
    a cross-linked polymeric framework; and
    a plurality of pores for gas sorption;
    wherein the cross-linked polymeric framework comprises aromatic ring-containing monomeric units comprising at least two aromatic rings and wherein the aromatic ring-containing monomeric units are linked by covalent cross-linking between aromatic rings;
  the recipient being designed to sustain a nominal maximum internal pressure P1 greater than atmospheric pressure;

the porous gas storage material being disposed within said recipient; and loading the recipient with the gas to a pressure P2 equal to or lower than P1.

In a second aspect, the invention provides a method of producing a porous gas storage material, wherein the method comprises:

providing aromatic ring-containing monomers comprising at least two aromatic rings; and subjecting the monomers to a metal-catalyzed cross-coupling reaction, optionally a Yamamoto-type cross-coupling reaction;

to form a gas storage material comprising a cross-linked polymeric framework with aromatic ring-containing monomeric units joined directly by covalent bonds between aromatic rings, and comprising a plurality of pores for gas sorption.

In a third aspect, the invention provides a method of producing a porous gas storage material, wherein the method comprises:

providing aromatic ring-containing monomers comprising at least two aromatic rings; and cross-linking the monomers by a Friedel-Crafts alkylation reaction;

to form a gas storage material comprising a cross-linked polymeric framework with aromatic ring-containing monomeric units joined by a cross-linking moiety between aromatic rings (optionally an aliphatic group, for example, an alkyl group), and comprising a plurality of pores for gas sorption;

wherein at least a subset of the aromatic ring-containing monomeric units comprises at least five aromatic rings; or wherein at least a subset of the aromatic ring-containing monomeric units are selected from the group consisting of:

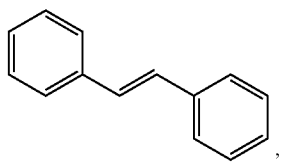

optionally at least a subset of the aromatic ring-containing monomeric units are selected from the group consisting of:

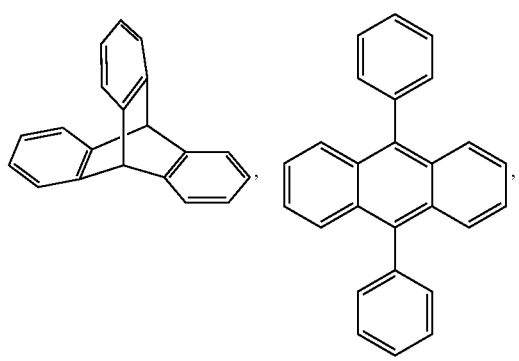

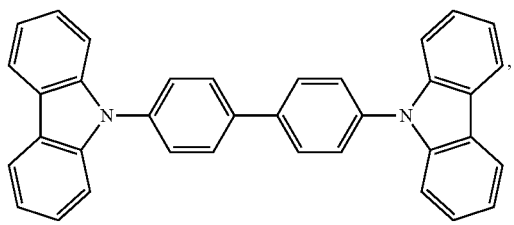

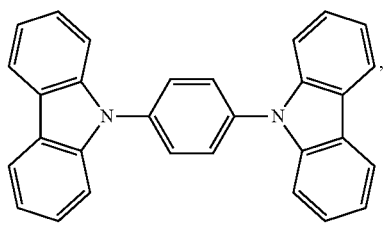

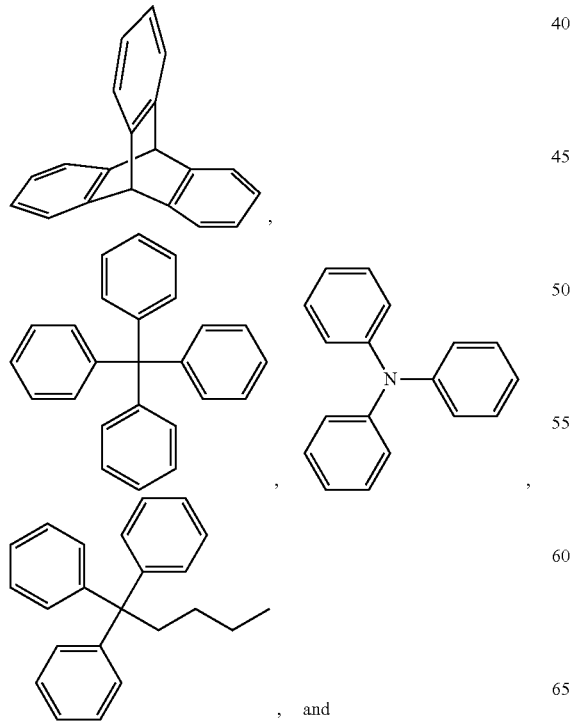

, and

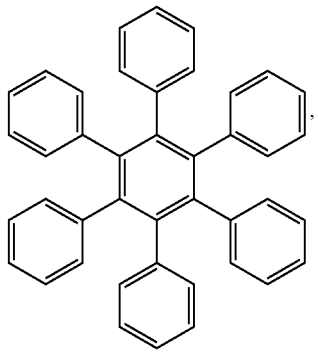

-continued

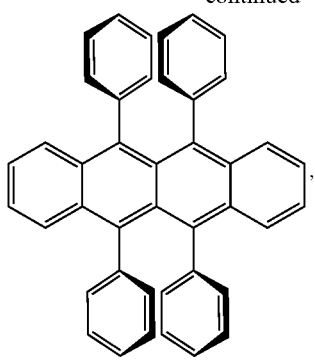

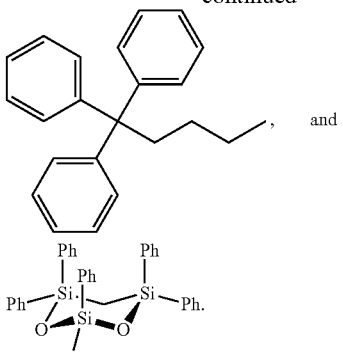

In a fourth aspect, the invention provides a porous gas storage material comprising:
a cross-linked polymeric framework; and
a plurality of pores for gas sorption;
wherein the cross-linked polymeric framework comprises aromatic ring-containing monomeric units comprising at least two aromatic rings and wherein the aromatic ring-containing monomeric units are linked by covalent bonds directly between aromatic rings.

In a fifth aspect, the invention provides a porous gas storage material comprising:
a cross-linked polymeric framework; and
a plurality of pores for gas sorption;
wherein the cross-linked polymeric framework comprises aromatic ring-containing monomeric units comprising at least two aromatic rings and wherein the aromatic ring-containing monomeric units are linked by a cross-linking moiety (optionally an aliphatic group, for example, an alkyl group) between aromatic rings;
wherein at least a subset of the aromatic ring-containing monomeric units comprises at least five aromatic rings; or
wherein at least a subset of the aromatic ring-containing monomeric units are selected from the group consisting of:

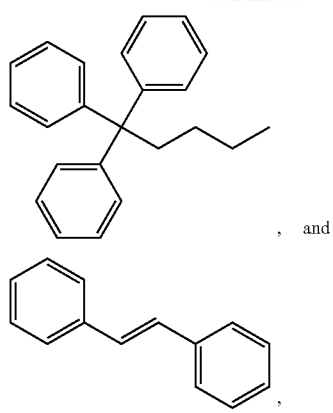, and
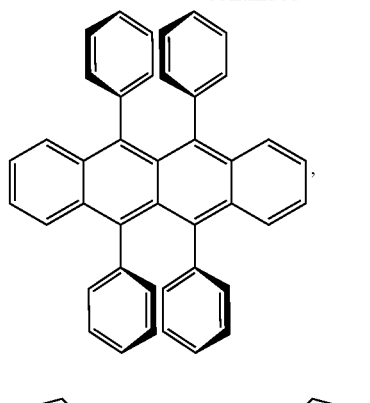,
optionally at least a subset of the aromatic ring-containing monomeric units are selected from the group consisting of:
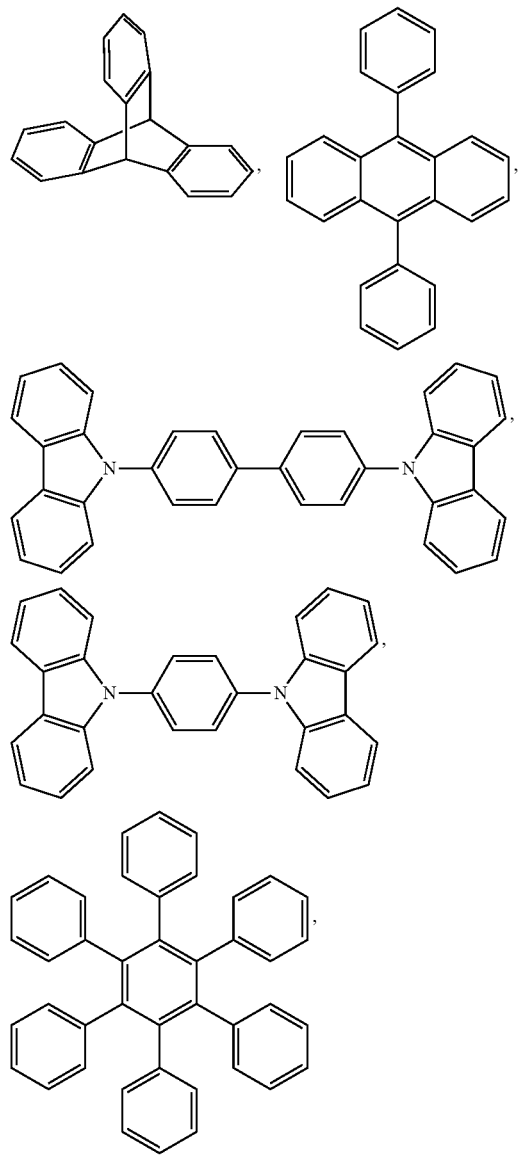
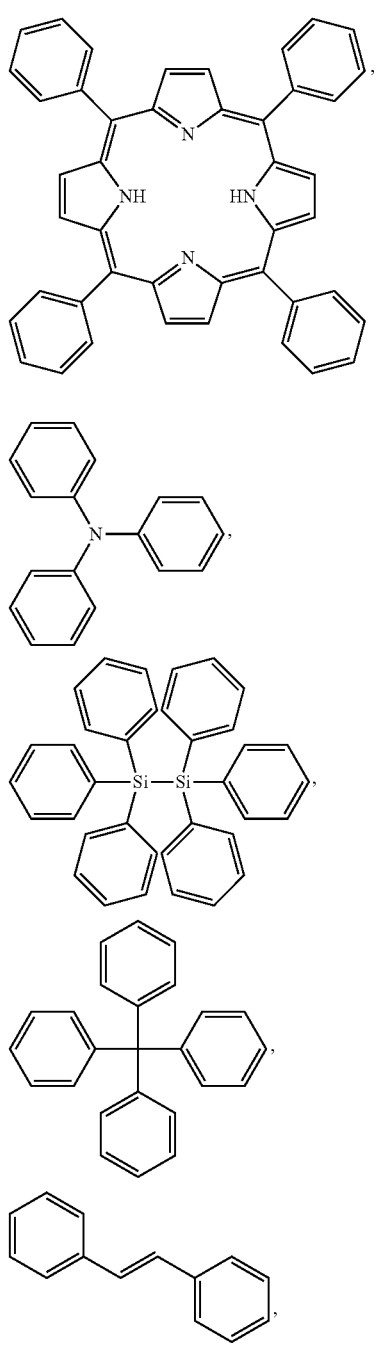

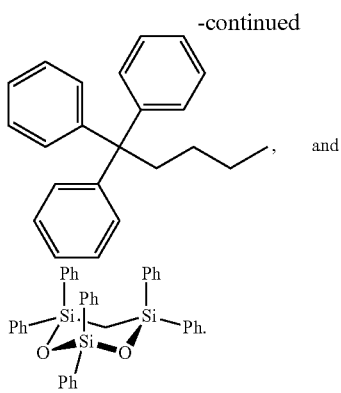

, and

In a sixth aspect, the invention provides a gas storage material as described herein for use in storing gas at a pressure higher than atmospheric pressure.

In a seventh aspect, the invention provides the use of a gas storage material as described herein for storing gas at a pressure higher than atmospheric pressure.

BRIEF DESCRIPTION OF THE FIGURES

Specific embodiments of the invention are described below by way of example only and with reference to the accompanying drawings, in which.

DETAILED DESCRIPTION OF THE INVENTION

Figure 1:
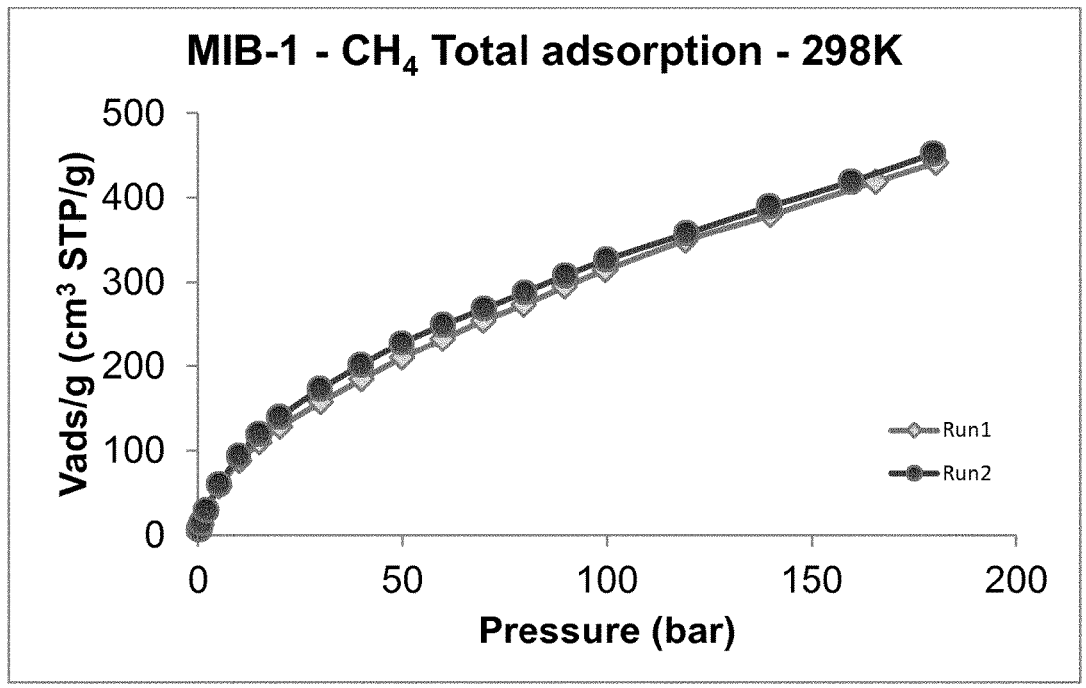
FIG. 1 shows methane sorption isotherms for material MIB-1 up to 180 bar.
Figure 2:
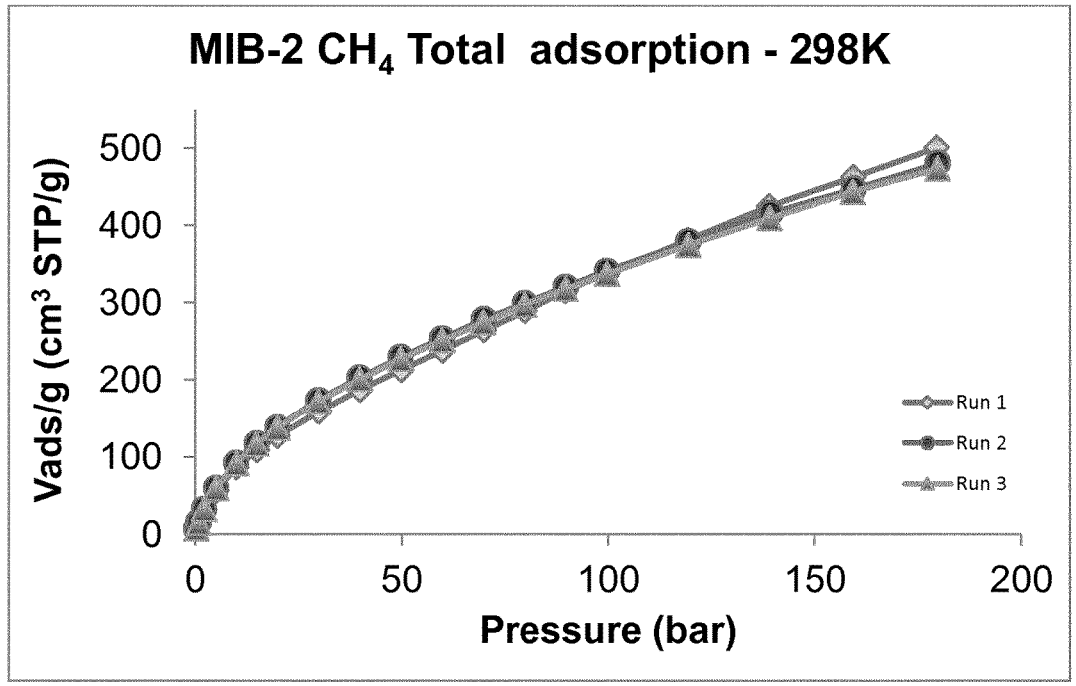
FIG. 2 shows methane sorption isotherms for material MIB-2 up to 180 bar.
Figure 3:
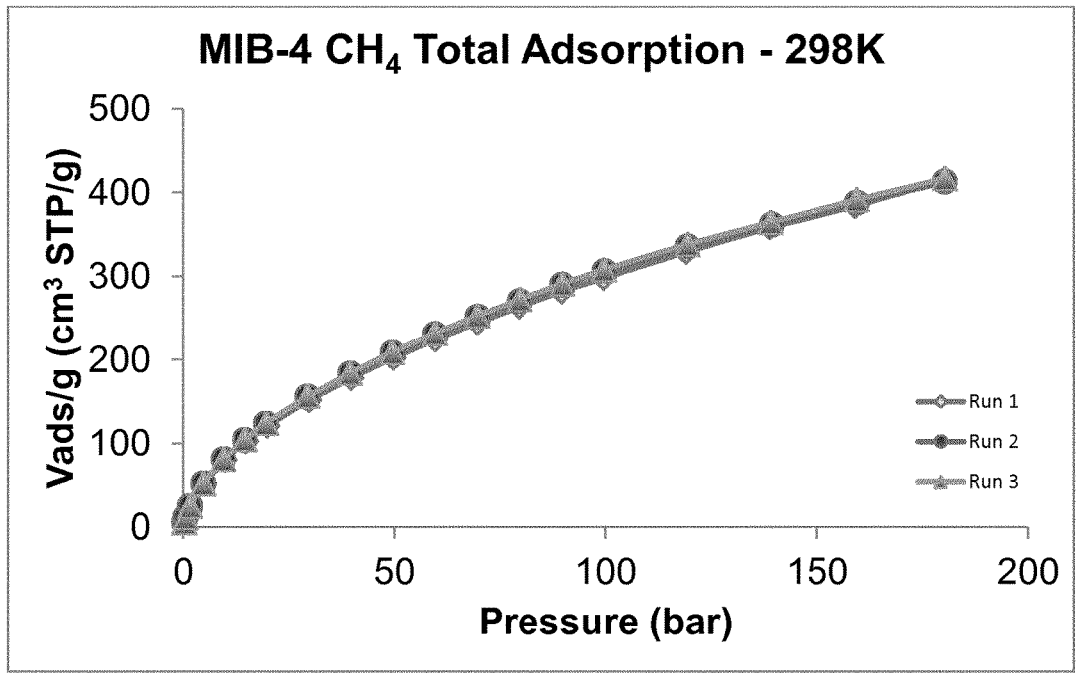
FIG. 3 shows methane sorption isotherms for material MIB-4 up to 180 bar.
Figure 4:
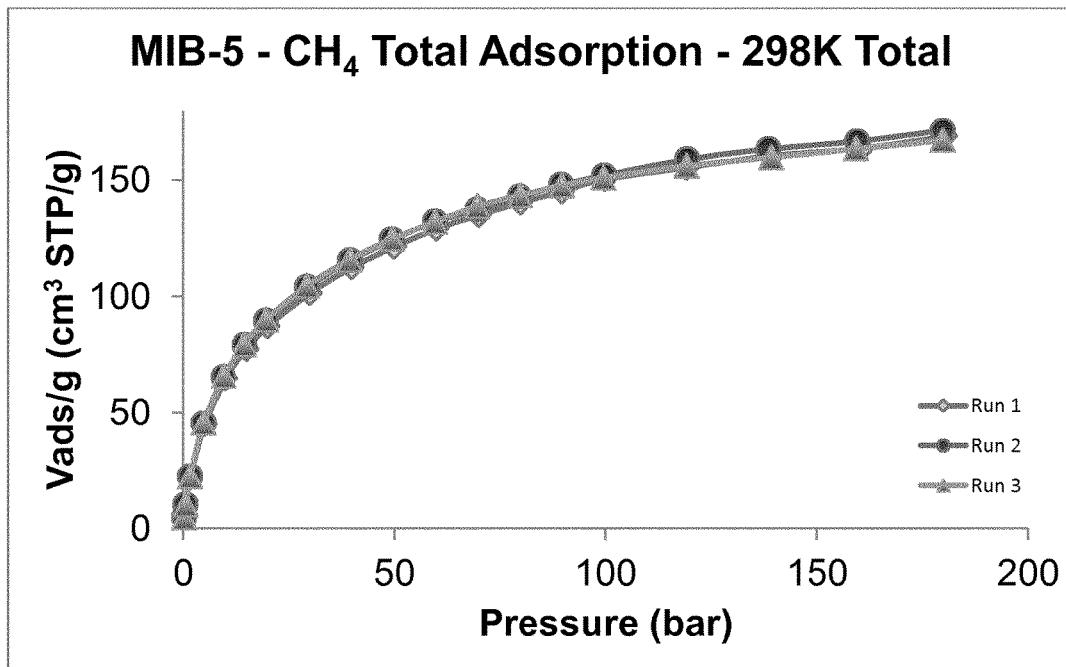
FIG. 4 shows methane sorption isotherms for material MIB-5 up to 180 bar.
Figure 5:
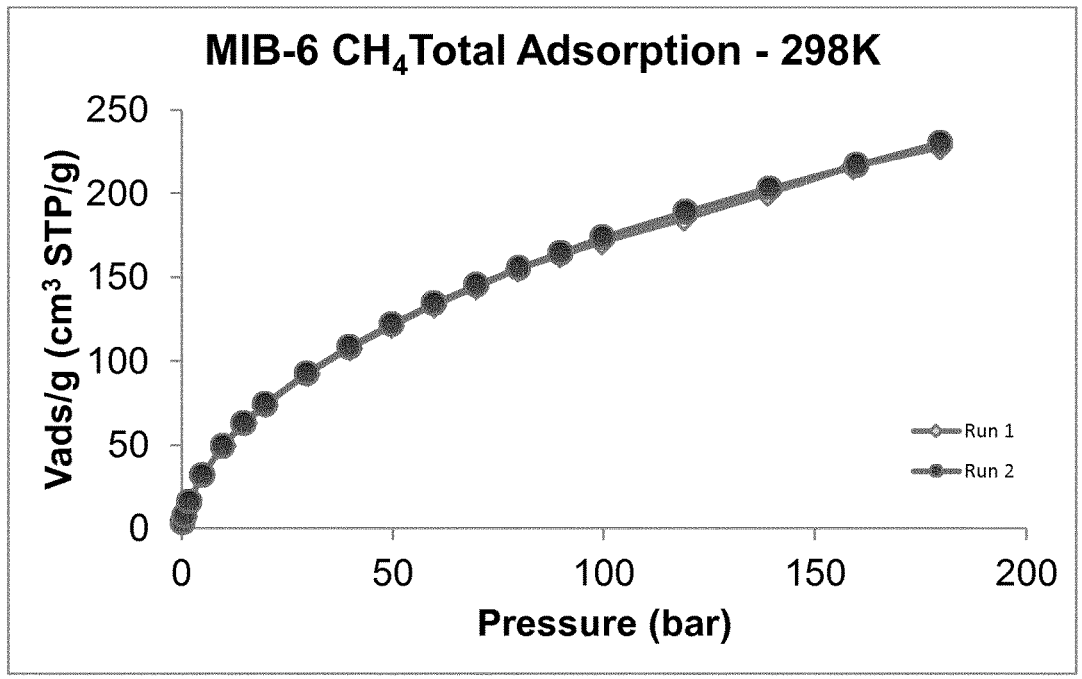
FIG. 5 shows methane sorption isotherms for material MIB-6 up to 180 bar.
Figure 6:
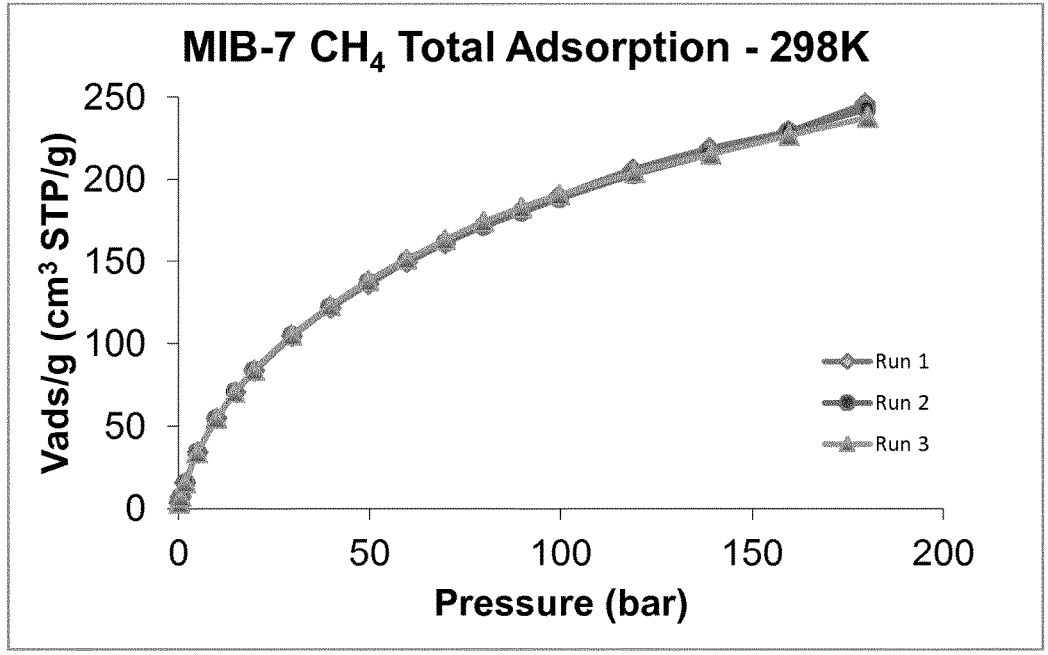
FIG. 6 shows methane sorption isotherms for material MIB-7 up to 180 bar.
Figure 7:
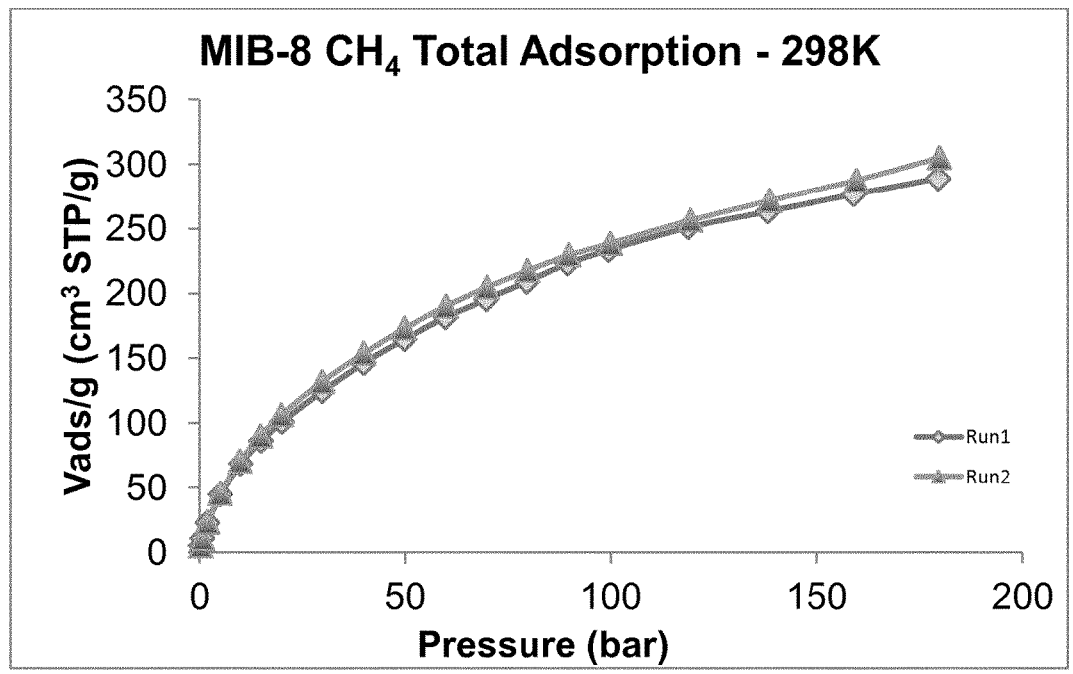
FIG. 7 shows methane sorption isotherms for material MIB-8 up to 180 bar.
Figure 8:
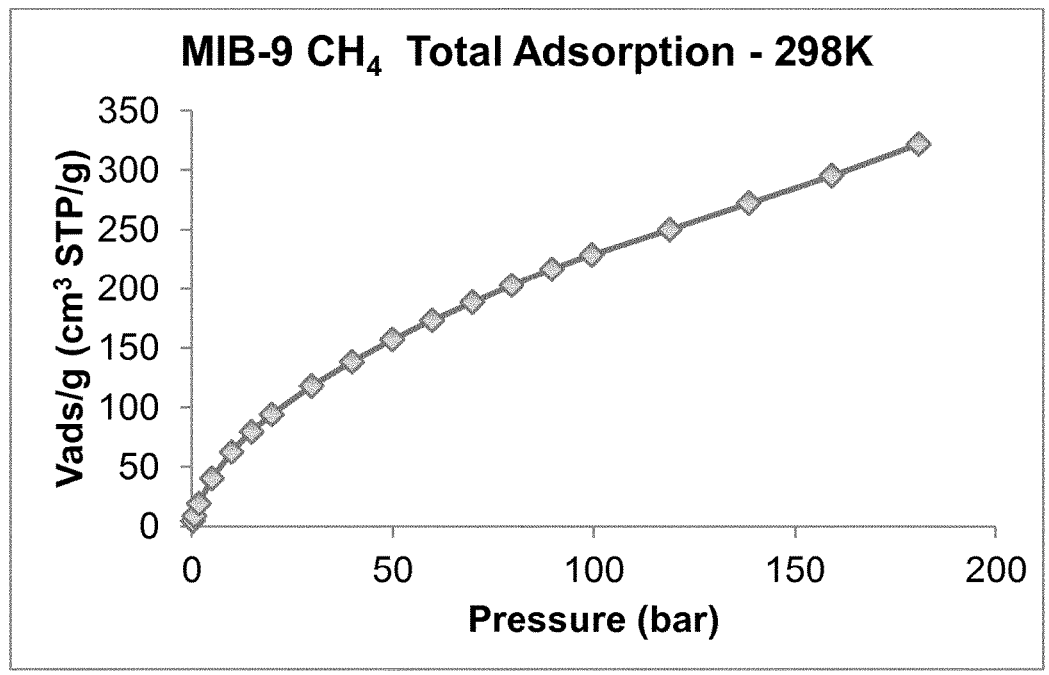
FIG. 8 shows a methane sorption isotherm for material MIB-9 up to 180 bar.
Figure 9:
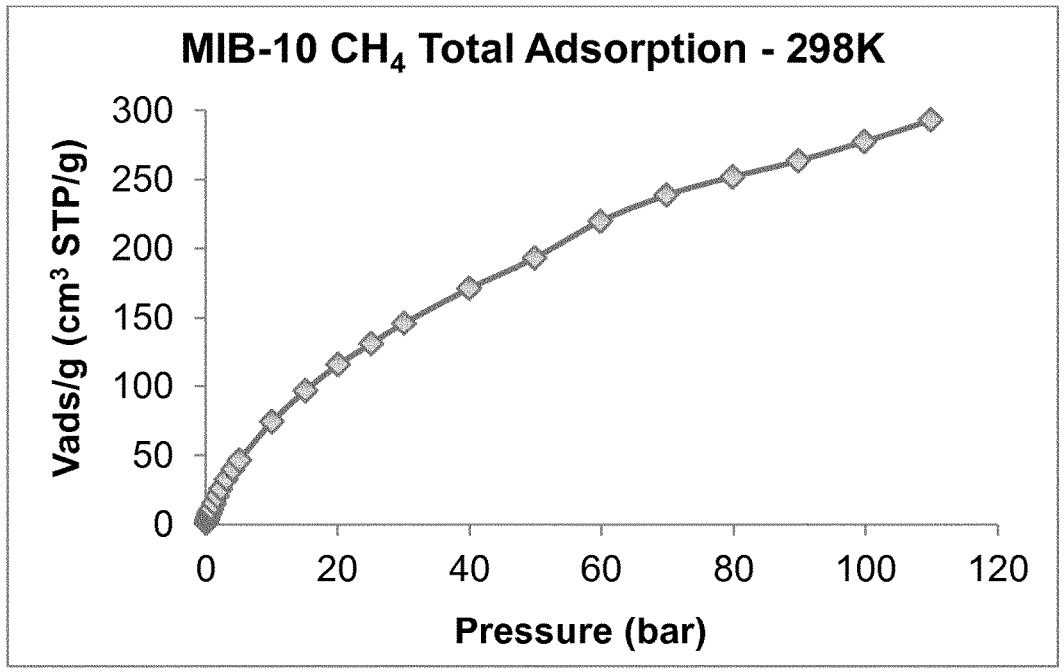
FIG. 9 shows a methane sorption isotherm for material MIB-10 up to 110 bar.
Figure 10:
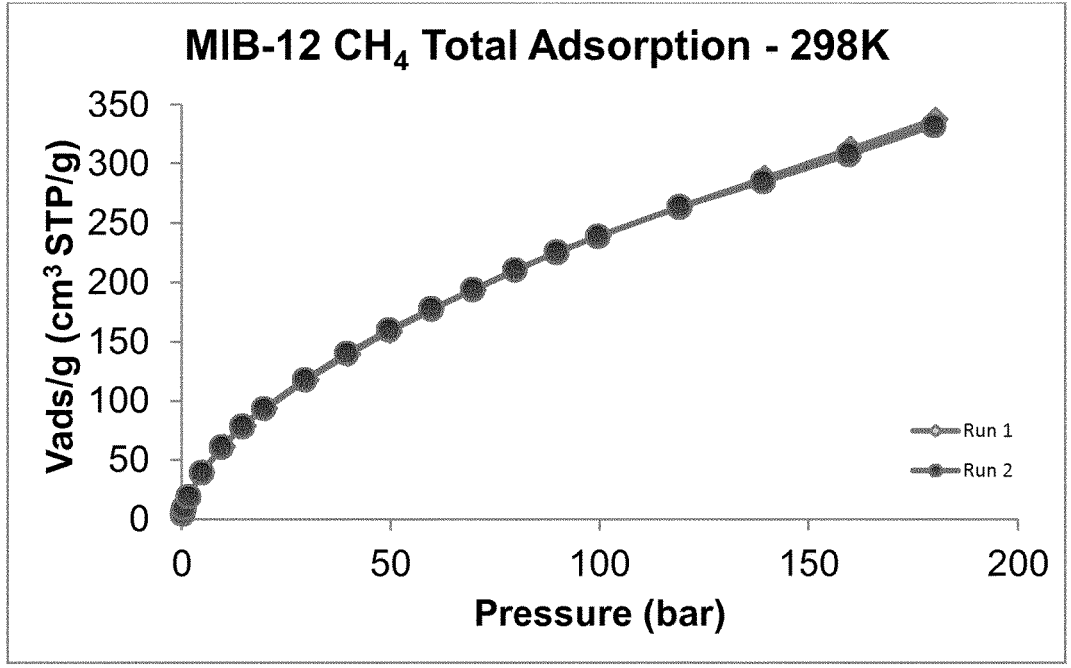
FIG. 10 shows methane sorption isotherms for material MIB-12 up to 180 bar.
Figure 11:
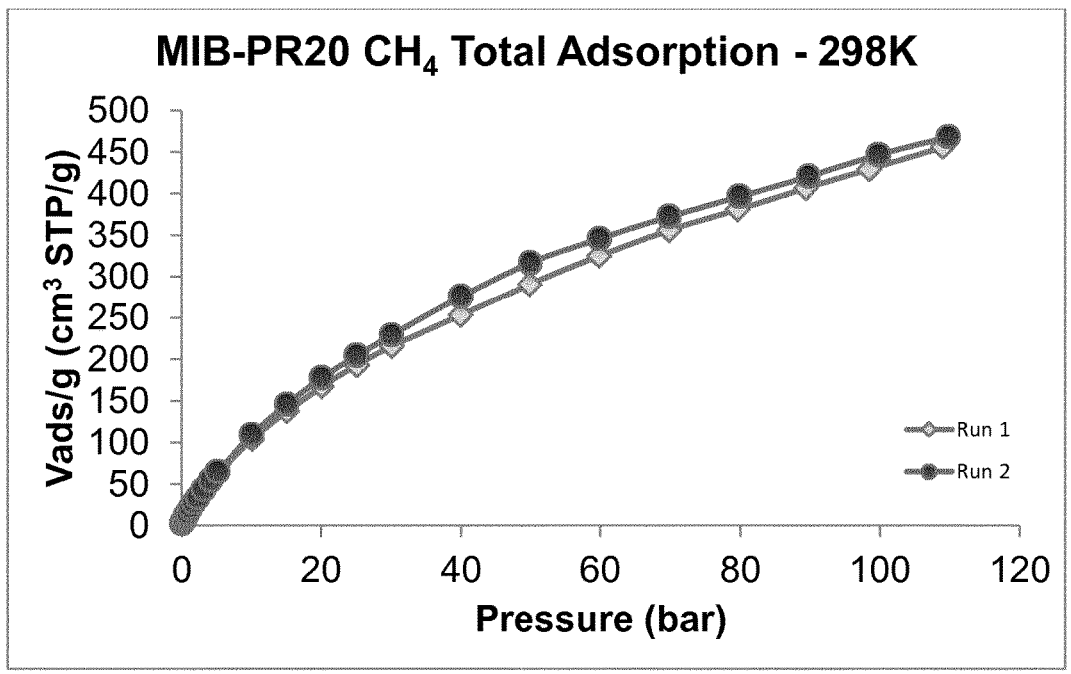
FIG. 11 shows methane sorption isotherms for material MIB-PR20 up to 110 bar.
Figure 12:
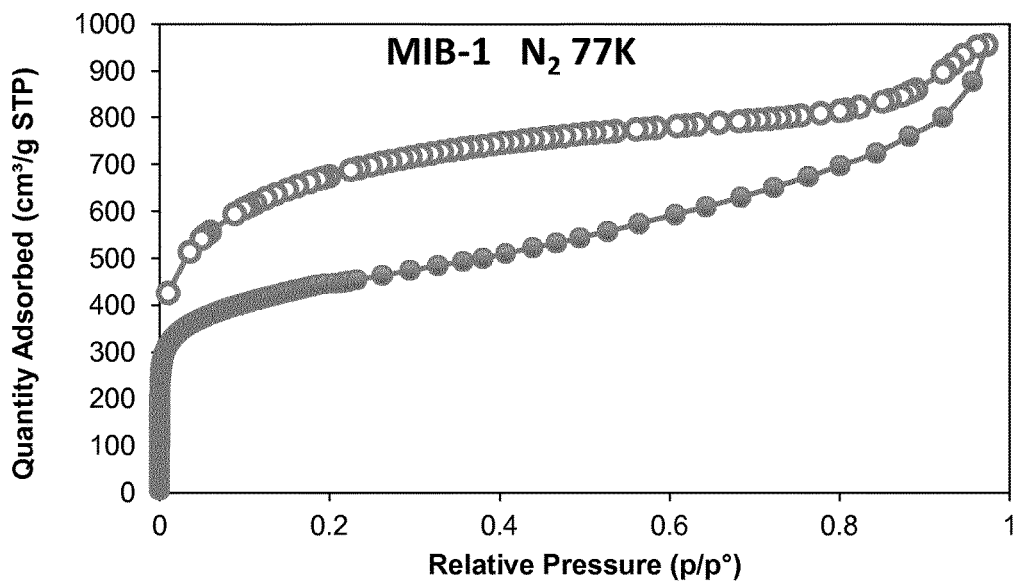
FIG. 12 shows nitrogen adsorption (filled markers) and desorption (empty markers) isotherms for material MIB-1 used for material characterization.
Figure 13:
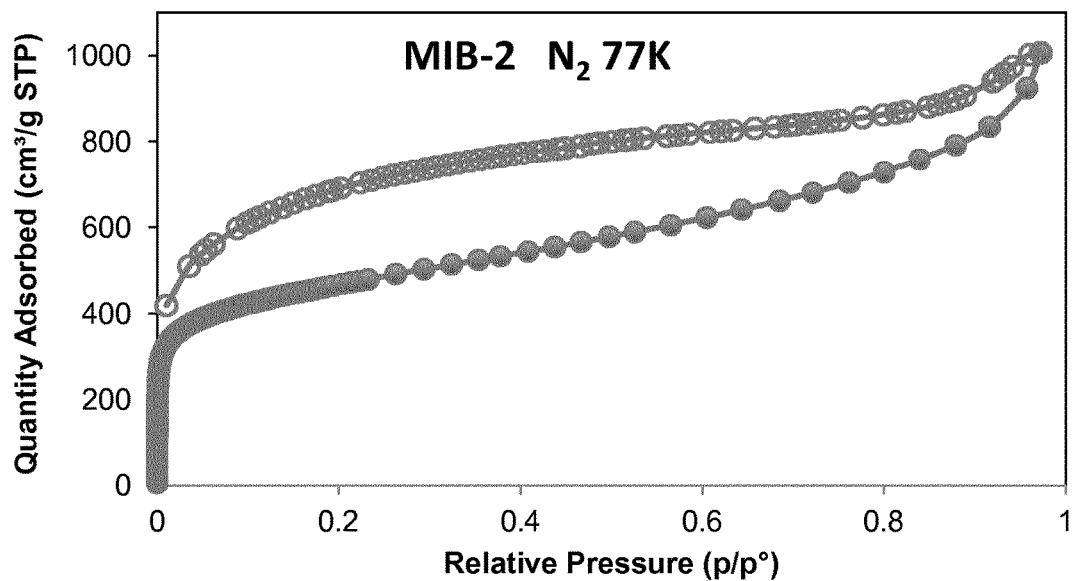
FIG. 13 shows nitrogen adsorption (filled markers) and desorption (empty markers) isotherms for material MIB-2 used for material characterization.
Figure 14:
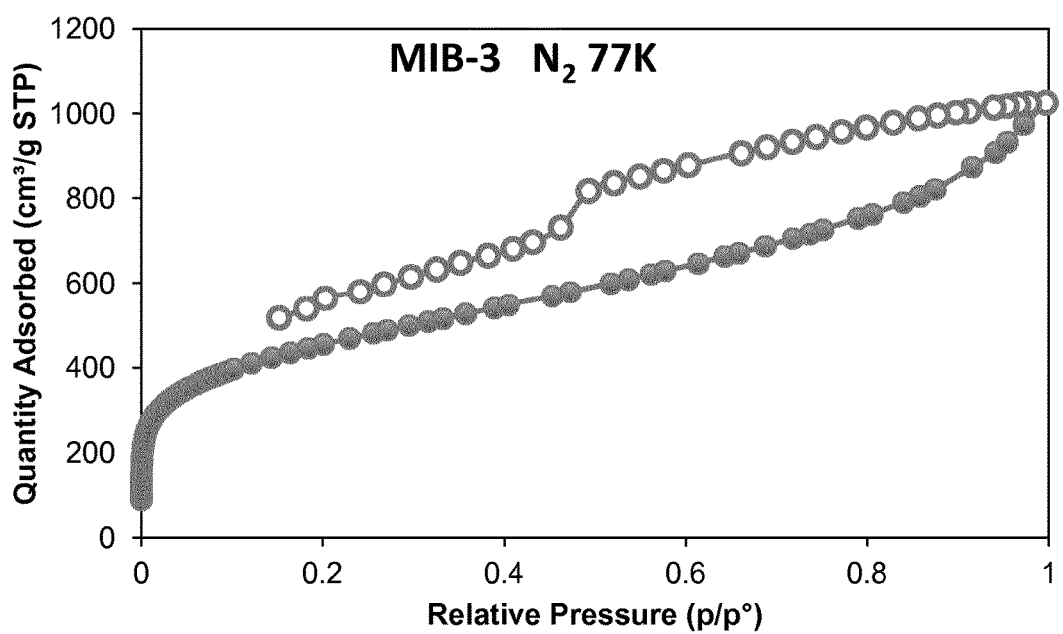
FIG. 14 shows nitrogen adsorption (filled markers) and desorption (empty markers) isotherms for material MIB-3 used for material characterization.
Figure 15:
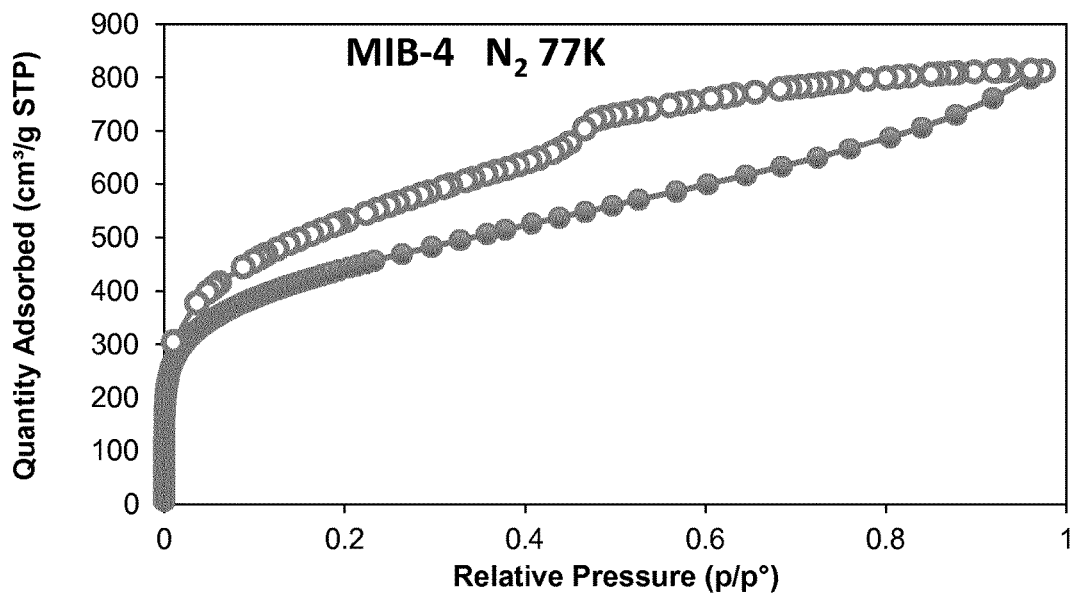
FIG. 15 shows nitrogen adsorption (filled markers) and desorption (empty markers) isotherms for material MIB-4 used for material characterization.
Figure 16:
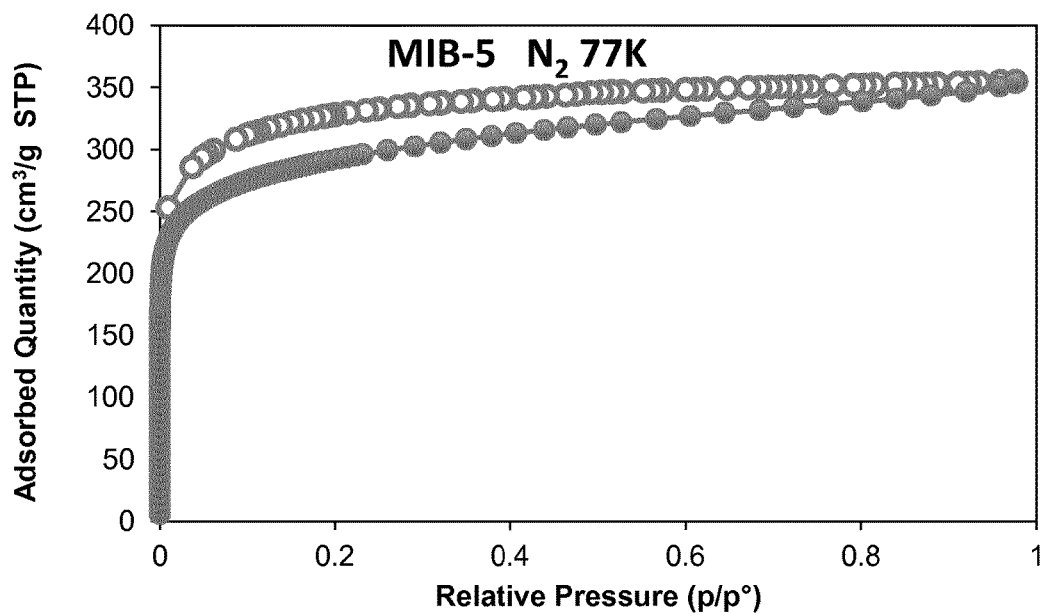
FIG. 16 shows nitrogen adsorption (filled markers) and desorption (empty markers) isotherms for material MIB-5 used for material characterization.
Figure 17:
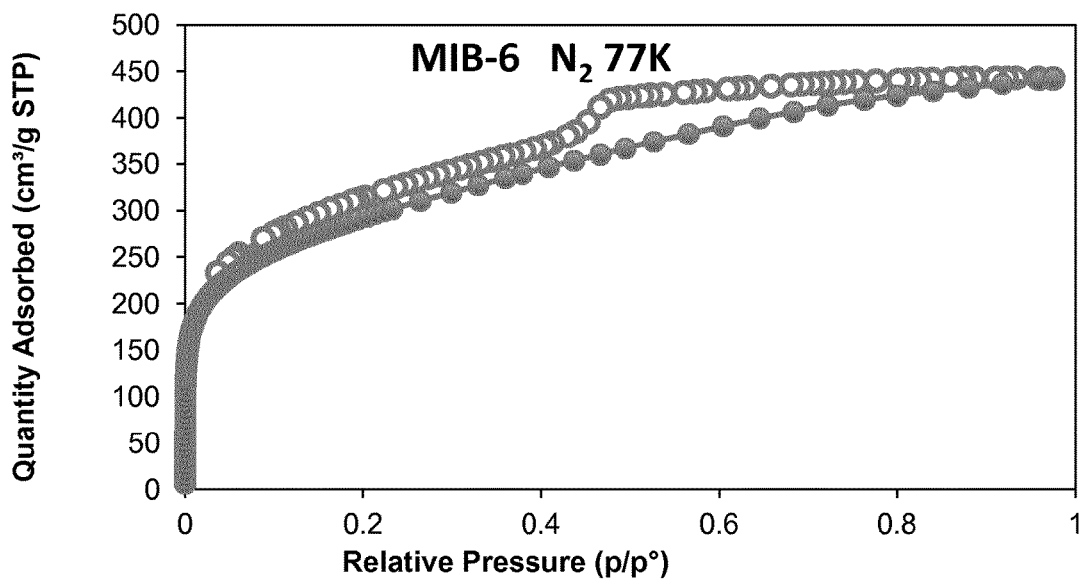
FIG. 17 shows nitrogen adsorption (filled markers) and desorption (empty markers) isotherms for material MIB-6 used for material characterization.
Figure 18:
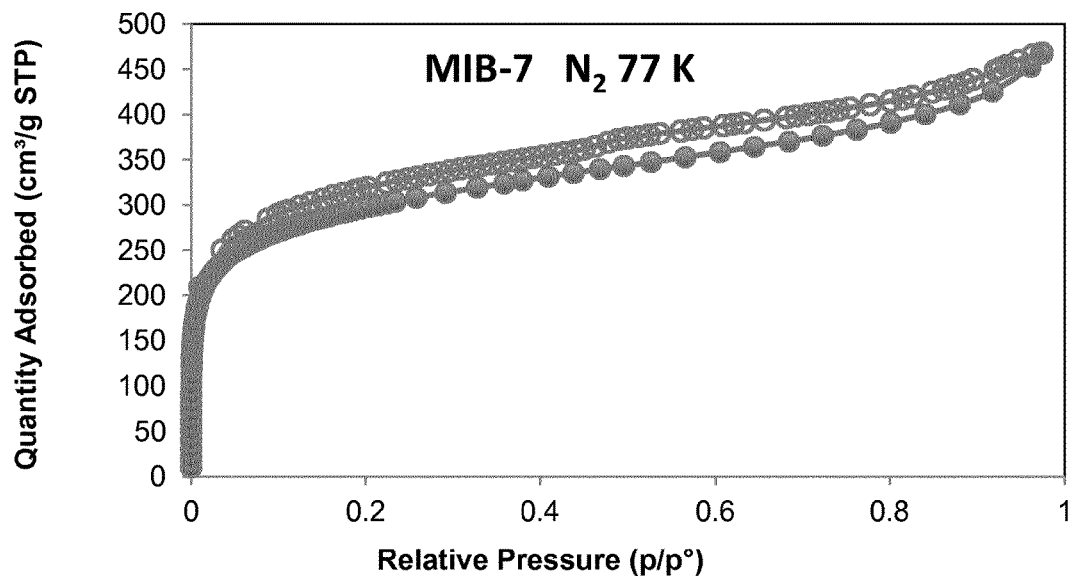
FIG. 18 shows nitrogen adsorption (filled markers) and desorption (empty markers) isotherms for material MIB-7 used for material characterization.
Figure 19:
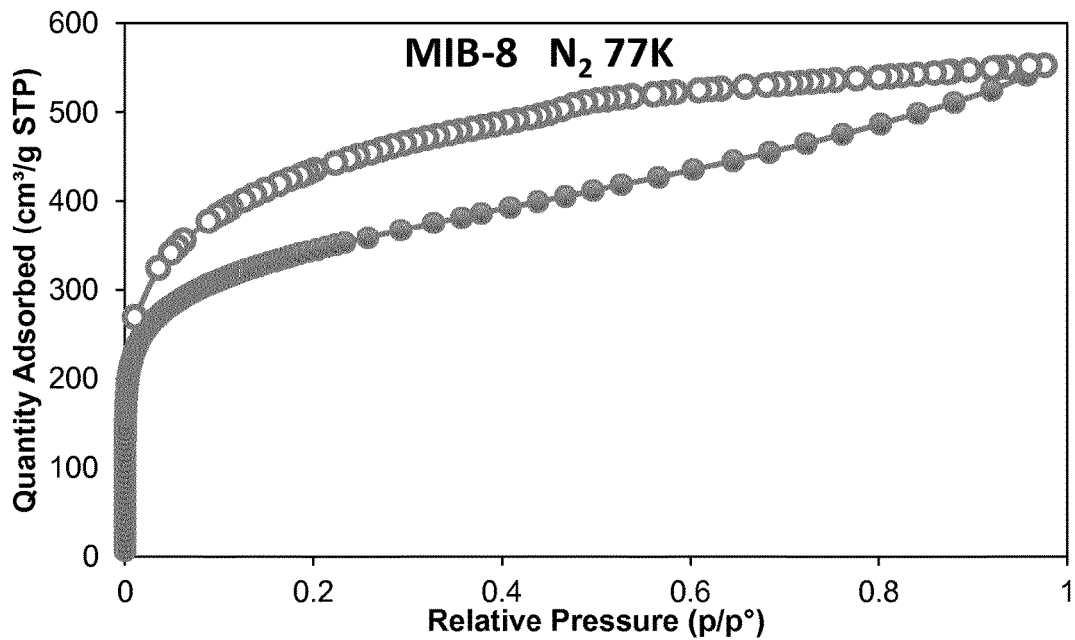
FIG. 19 shows nitrogen adsorption (filled markers) and desorption (empty markers) isotherms for material MIB-8 used for material characterization.
Figure 20:
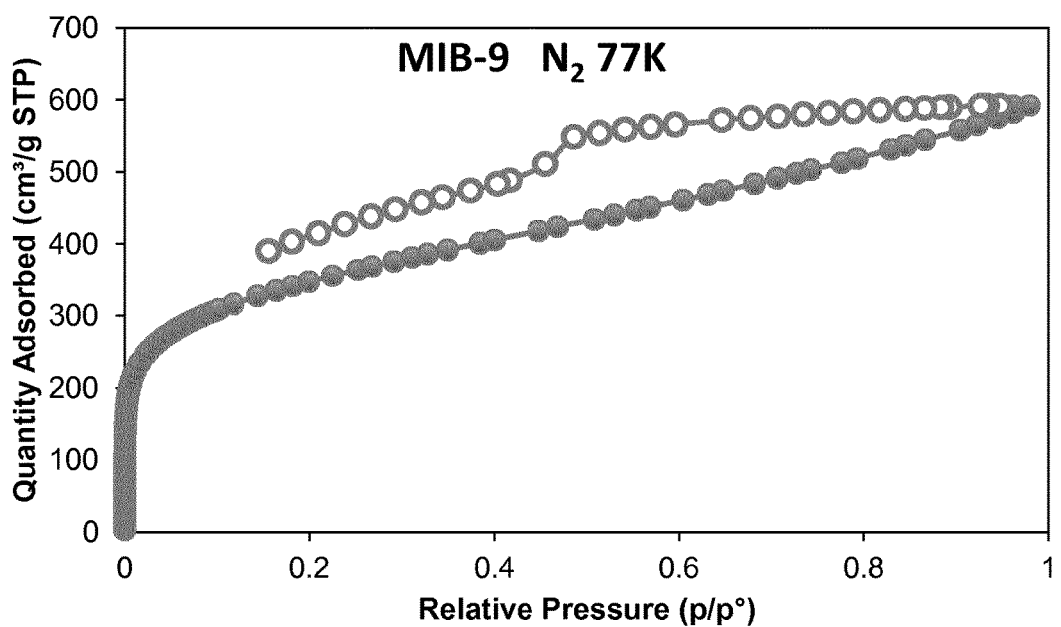
FIG. 20 shows nitrogen adsorption (filled markers) and desorption (empty markers) isotherms for material MIB-9 used for material characterization.
Figure 21:
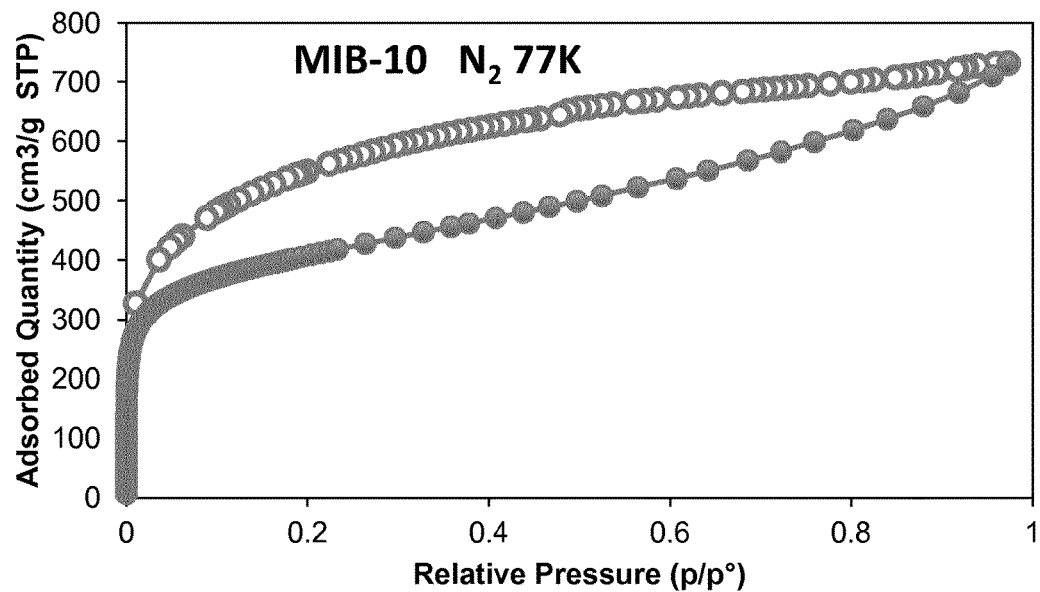
FIG. 21 shows nitrogen adsorption (filled markers) and desorption (empty markers) isotherms for material MIB-10 used for material characterization.
Figure 22:
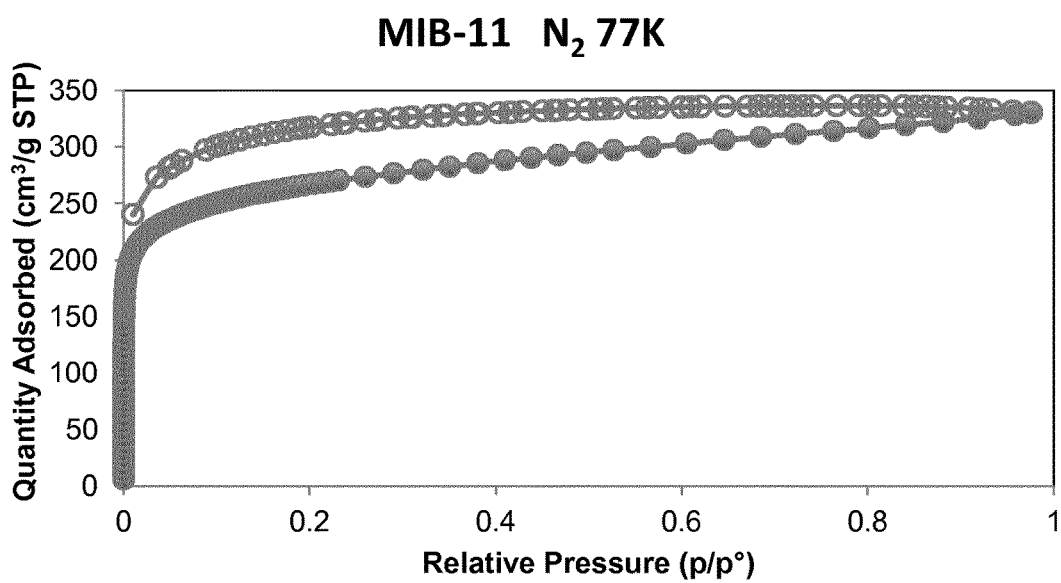
FIG. 22 shows nitrogen adsorption (filled markers) and desorption (empty markers) isotherms for material MIB-11 used for material characterization.
Figure 23:
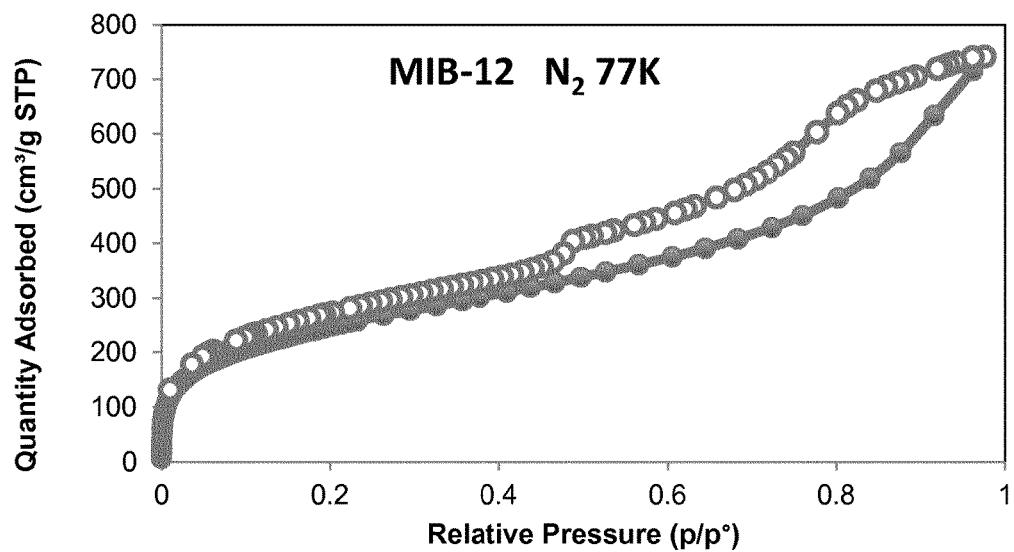
FIG. 23 shows nitrogen adsorption (filled markers) and desorption (empty markers) isotherms for material MIB-12 used for material characterization; and, FIG. 24 shows an example of pore distribution diagram for material MIB-7.

The gas storage materials of the invention comprise a cross-linked polymeric framework. This cross-linked polymeric framework is preferably a hypercross-linked polymeric framework. The hypercross-linked polymer arranges itself to form a highly porous, amorphous cross-linked polymeric framework. Hypercross-linked polymers have smaller pore sizes and relatively higher surface area and porosities compared with simple cross-linked polymers. The hypercross-linked polymers are prepared by extensively cross-linking aromatic ring-containing monomers with each monomer providing a monomeric unit in the polymeric framework. The monomers are linked by covalent cross-links between aromatic rings, preferably carbon-carbon bonds. This may be by direct C—C bonds between aromatic rings of respective monomeric units, which may optionally be achieved by a metal-catalyzed cross coupling reaction, optionally of the Yamamoto-type, or covalent linkage through a cross-linking moiety between aromatic rings of respective monomeric units, which may optionally be achieved by a Friedel-Crafts alkylation reaction. Following either of these two linking strategies, an extensive cross-linking of monomers leads to a rigid three dimensional porous framework with a very high surface area. The higher the degree of cross-linking of the monomers in the network, the greater the specific surface area for gas adsorption is. In hypercross-linked polymers, cross-linking occurs concurrently with polymerization during synthesis by the same reaction. Accordingly, unlike simple cross-linked polymers, there may be no distinction between bonds between monomeric units in a polymer chain and the cross-links in hypercross-linked polymers. The aromatic ring-containing monomers may possess multiple reactive sites and so form multiple cross-links with other monomers to form a lattice-like structure. This results in a highly cross-linked framework in which any monomeric unit may be bonded to two or more than two other monomeric units.

The formation of the covalent cross-links immobilizes and imparts rigidity to the aromatic ring-containing monomer units, which are consequently arranged in a poorly-packed manner. The aromatic ring-containing monomers themselves may have a high degree of structural rigidity. The aromatic ring-containing monomers may be selected on the basis of an intrinsic tendency to arrange themselves in a poorly-packed manner, i.e. irrespective of the subsequently formed cross-links between monomeric units. The multiple aromatic rings (especially six member rings, such as benzene and derivatives, or benzene containing ring systems) in the monomers provide this structural stability. These monomers are stable and contain such an electron density that promotes interaction with methane hydrogen atoms and positively charged carbon atoms of carbon dioxide. The multiple reaction sites on the aromatic ring-containing monomers provide further tendency for branching and spatial development of the network.

The aromatic ring-containing monomers are polymerized/cross-linked to form the cross-linked polymeric framework comprising aromatic ring-containing monomeric units, with each monomer providing a monomeric unit in the polymeric framework. The core molecular structure of the aromatic ring-containing monomers is retained within the individual aromatic ring-containing monomeric units in the cross-linked polymeric framework, irrespective of the synthetic route. A skilled person will appreciate that, depending on the method for cross-linking/polymerizing the monomers, the monomers may contain leaving groups that are no longer present in the monomeric units of the polymeric framework.

A polymer is generally formed from at least 10 monomeric units, optionally at least 20 monomeric units, optionally at least 100 monomeric units. The cross-linked polymeric framework may comprise aromatic ring-containing monomeric units, wherein the aromatic ring-containing monomeric units are all of the same structure. Alternatively, the cross-linked polymeric framework may comprise a copolymer comprising two or more subsets of structurally distinct monomeric units. Thus, a copolymer will be formed from at least two subsets of aromatic ring-containing monomeric units, each structurally distinct, or at least one subset of aromatic ring-containing monomeric units and one or more structurally distinct monomeric units. A copolymer may, for example, comprise two structurally distinct monomeric units, or comprise three structurally distinct monomeric units (in which case the copolymer may also be referred to as a terpolymer).

As used herein, the term "aromatic ring" encompasses carbocyclic aromatic rings and heteroaromatic rings. An aromatic ring may be a $C_6$ carbocyclic aromatic ring or a 5- or 6-membered heteroaromatic ring. A heteroaromatic ring contains, in addition to carbon ring atoms, one or more ring heteroatoms selected from oxygen, nitrogen, phosphorus and sulfur, preferably nitrogen. Optionally, an aromatic ring is phenyl, pyrrolyl, imidazolyl, pyrazolyl, isoxazolyl, oxazolyl, thiazolyl, pyridinyl, pyridazinyl, pyrimidinyl or pyrazinyl preferably phenyl or pyrrolyl. An aromatic ring may optionally be fused with another aromatic ring or another cyclic organic moiety to form a bi-, tri- or poly-cyclic ring system. Preferably, a bi-, tri- or poly-cyclic ring system is a conjugated system. Accordingly, in the context herein, a bi-cyclic conjugated ring system, such as napthyl, comprises two aromatic rings. A bi-, tri- or pol-cyclic ring system is preferably napthyl, anthracyl, tetracyl, carboxazolyl, indolyl, isoindolyl, indazolyl, indolizidinyl, isoquinolyl, quinazolyl or quinolyl, preferably, antracyl, tetracyl or carboxazolyl. An aromatic ring may be optionally substituted with one or more groups selected from aliphatic (preferably alkyl), halogen (preferably fluoro), —COOR, —NR$_2$, or —OR, wherein R is independently hydrogen or an aliphatic group (for example, alkyl).

A cross-linking moiety is a group capable of bonding to at least two other groups. According to a first cross-linking strategy, a cross-linking moiety is a group that may be introduced into the cross-linked polymeric framework in order to link aromatic ring-containing monomeric units. A cross-linking moiety may be introduced by a Friedel-Crafts alkylation reaction, where the cross-linking moiety is the alkyl source for the alkylation (i.e. it is the electrophilic group). A cross-linking moiety may be an aliphatic group, preferably, an alkyl group.

According to a second cross-linking strategy, the aromatic ring-containing monomeric units may be cross-linked by a metal-catalyzed cross-coupling reaction, optionally of the Yamamoto-type.

"Aliphatic" as used herein may be a straight or branched chain or cyclic aliphatic group which is completely saturated or contains one or more units of unsaturation. An aliphatic group may contain 1 to 6 carbon atoms, preferably 1 to 3, preferably one carbon atom. An aliphatic group is preferably an alkyl group, preferably methyl. An aliphatic group may be substituted with one or more groups selected from aliphatic (preferably alkyl) or halo (preferably fluoro) or contain one or more units of unsaturation (e.g. an alkene or alkyne moiety). The terms alkyl (or alkane) as used herein refers to a straight or branched chain alkyl group. The terms alkenyl (or alkene) as used herein refers to an alkyl chain containing at least one C=C double bond. The terms alkynyl (or alkyne) as used herein refers to an alkyl chain containing at least one C≡C triple bond.

The materials described herein may be defined as nanoporous materials. Nanoporous materials generally comprise pores of 100 nm or smaller. Nanoporous materials can be subdivided into three categories: microporous materials (comprising pore sizes of less than 2 nm, generally 0.2 nm to 2 nm), mesoporous materials (comprising pore sizes of 2 to 50 nm) and macroporous materials (comprising pore sizes of more than 50 nm). The gas storage material of the invention preferably comprises micropores (preferably with pore sizes centred between about 1 nm and about 2 nm, optionally between about 1.0 nm and about 1.8 nm, optionally between about 1.2 nm and 1.8 nm). Pore size can be estimated by density functional theory (DFT) analysis or other alternative methods from the nitrogen absorption branch at 77K as shown in the examples. The pore size distribution (PSD) was calculated by non-local Density Functional Theory (DFT), applied to $N_2$ adsorption isotherms at 77K (slit pore geometry was used). This DFT analysis is based on a library of computational results, derived by the gas adsorption on various pore sizes and specific pore morphologies. The PSD is calculated from the experimental adsorption isotherms by solving the integral adsorption equation represented as the convolution of a set of theoretical isotherms versus pore size (the DFT kernel). The output is a distribution plot, such as the one shown in FIG. 24.

The micropore volume is that portion of the total pore volume attributable to micropores (i.e. pores of less than about 2 nm). The total pore volume and the micropore volume can respectively be measured at $p/p^0=0.97$; and $p/p^0=0.1$, from the nitrogen adsorption isotherms at 77K shown, for example, in FIGS. 12 to 23. $p^0$ is the pressure of liquefaction of $N_2$ at 77K, i.e. about the atmospheric pressure.

Brunauer-Emmett-Teller (BET) specific surface area ($S_{BET}$) is a measure of the surface areas per unit mass of solids by physical adsorption of gas molecules. It can be calculated by the BET equation:

$$\frac{1}{v[(p_0/p)-1]} = \frac{c-1}{v_m c}\left(\frac{p}{p_0}\right) + \frac{1}{v_m c};$$

where $p/p_0$ is the relative pressure, $v$ is the adsorbed gas quantity, and $v_m$ is the quantity of adsorbed gas as a monolayer. C is the BET constant. This can then be plotted as a BET plot, $1/v[(p_0/p)-1]$ against $p/p_0$, using experimental results (see the examples). The value of the slope A and the y-intercept I of the line can be used to calculate the weight of adsorbed gas as a monolayer, $v_m$, and the BET constant, c, using the following equations:

$$v_m = \frac{1}{A+I}; \text{ and}$$

$$c = 1 + \frac{A}{I}.$$

The total surface area, $S_{total}$ and the BET specific surface area, $S_{BET}$, are given by:

$$S_{total} = \frac{(v_m N s)}{V}; \text{ and}$$

$$S_{BET} = \frac{S_{total}}{a},$$

where N is the Avogadro number; s is the adsorption cross-section of the adsorbing species; V is the molar volume of the adsorbate gas and a is the mass of the solid/adsorbent.

The Langmuir specific surface area is a measure of the surface areas of solids by physical adsorption of gas molecules. The Langmuir type isotherm is concave to the $p/p^0$ axis and the amount of adsorbed molecules to cover the surface with a monolayer of gas molecules approaches a limiting value as $p/p_0 \to 1$. The Langmuir adsorption isotherm equation can be described as follows:

$$\frac{n}{n_m} = \theta = \frac{K_L P}{(1+K_L P)} \text{ with } \theta = \frac{\Gamma}{\Gamma_{mon}}.$$

where $K_L$ is a constant, P is the pressure, $n_m$ is the monolayer capacity defined as the amount of adsorbate needed to cover the surface with a complete monolayer of molecules and n is the amount of adsorbed gas at a specific pressure P. The surface coverage ($\theta$) is defined as the ratio of the amount of adsorbed substance ($\Gamma$) to the monolayer capacity ($\Gamma_{mon}$ is the maximum amount adsorbed).

The present invention derives from the desire to develop nanoporous materials for storing gas (such as methane, natural gas and carbon dioxide) at high pressures, overcoming one or more restrictions connected with the nanoporous materials proposed up to now for similar purposes.

Storing gas at high pressures, for example pressures in excess of 40 bar; or in excess of 80 bar; or in excess of 100 bar; or in excess of 110 bar, and up to pressures, for example, of 180 bar; 200 bar; 250 bar; 300 bar; 500 bar or 1000 bar, allows progressively greater quantities of the gas to be confined in a given space. An effect of the materials described herein is that of increasing the amount of gas stored at a given pressure. This pressure may be a maximum pressure for an associated gas containment system. This maximum pressure can be a nominal maximum pressure.

Pressure vessels for storing and transporting CNG may have been tested and certificated for operation up to a nominal maximum pressure of, for example, 250 bar. By using the materials described herein, it would be possible, for example, to considerably increase the amount of loaded CNG at 250 bar. Alternatively, it would be possible to store a predetermined amount of CNG at reduced pressures. For example, the same amount of CNG stored in a CNG pressure vessel at 250 bar could be stored at a pressure well below 250 bar. This would then have a repercussion on the required pressure vessel wall thickness, which would be decreased. Assuming the pressure vessel comprises a composite structural layer that includes costly filamentous fibers (such as, for example, carbon fibers) and a thermosetting resin matrix, costs could be saved by reducing the required amount of fibers and matrix. In turn, reduction of carbon fiber supply may enable the viability of larger scale CNG storage/transportation projects.

The materials described herein have been experimentally tested under high pressure operating conditions, thereby providing confidence that the materials can deliver the intended effects. The 'deliverable' or 'delivered' gas amount is an important parameter in that it represents the difference between the amount of gas stored at a reference pressure and that residual gas stored at a desired delivery pressure. In the case of CNG, delivery pressures can be in the range between about 1 and 30 bar. A most effective uptake at low pressure, such as that achieved by metal containing materials (for example, MOFs), could therefore prove to be less useful in view of maximizing the amount of delivered gas between the reference and delivery pressures. In the materials and methods described herein, soft gas to pore-wall interactions are provided, inducing a moderate uptake slope in the low-pressure range and maximizing the loaded-gas amount at high pressures. Gas uptake in the pressure range 80-180 bar and above is possible with at least some of the materials and methods described herein. This is of course particularly useful for CNG applications, but it will be appreciated that these materials and methods are likely to perform satisfactorily in a wide-scope of further potential applications.

The materials described herein comprise high levels of porosity and thus high levels of surface area. These levels are achieved using a porous gas storage material comprising a cross-linked polymeric framework. Accordingly, in a first aspect, the invention provides a method of storing gas comprising:

providing a recipient for receiving the gas;
providing a porous gas storage material, the gas storage material comprising:
a cross-linked polymeric framework; and
a plurality of pores for gas sorption;
wherein the cross-linked polymeric framework comprises aromatic ring-containing monomeric units comprising at least two aromatic rings and
wherein the aromatic ring-containing monomeric units are linked by covalent cross-linking between aromatic rings;
the recipient being designed to sustain a nominal maximum internal pressure P1 greater than atmospheric pressure;
the porous gas storage material being disposed within or inside said recipient; and loading the recipient with the gas to a pressure P2 equal to or lower than P1.

P1 and P2 may each be significantly higher than atmospheric pressure. P2 may be equal to or exceed a value of N bar, wherein N is an integer comprised in the interval 2 to 180. The recipient can be loaded to achieve an internal pressure P2 equal to or greater than about 15 bar; 35 bar; 40 bar; 80 bar; 100 bar; 120 bar; 150 bar; or 180 bar. Thereby, the method provides for improved storage of gas at these pressures or above these pressures. P1 may be a value of up to several hundred bar. In contemplated CNG applications, P1 is 150 bar, or 180 bar, or 200 bar, or 250 bar, or 500 bar.

The gas may comprise methane, it being optionally compressed natural gas (CNG), it being optionally raw CNG. The gas may comprise $CO_2$ or $NO_2$.

The recipient may be a pressure vessel designed to store, or store and transport, the CNG, it being optionally for marine storage, or storage and transportation, of the CNG onboard a water-going naval craft (optionally, a ship or barge). The pressure vessels can be adapted on-board the ship or barge to form modules each comprising a plurality of operatively interlinked pressure vessels.

The pressure vessel may comprise a load-bearing structural portion made of a composite material, it being optionally a filamentous composite material. The composite material may comprise a thermosetting resin, optionally a dicyclopentadiene-based (DCPD-based) resin, optionally having a purity of 92% or above.

The pressure vessel may comprise a metallic or polymeric liner for containing the CNG.

The following discussion of the gas storage material of the invention applies to all aspects and embodiments of the invention as described herein, mutatis mutandis.

The cross-linked polymeric framework may comprise a copolymer comprising two or more structurally distinct aromatic ring-containing monomeric units.

The cross-linked polymeric framework may comprise aromatic ring-containing monomeric units comprising at least three aromatic rings, optionally at least four aromatic rings, optionally at least five aromatic rings, optionally at least six aromatic rings.

At least a subset of the aromatic ring-containing monomeric units may comprise at least four aromatic rings.

The aromatic ring-containing monomeric units or at least a subset of the monomeric units of the copolymer, may comprise two or more rings that are fused or linked in a conjugated system. Optionally the fused ring is a bi-, tri- or poly-cyclic ring. A bi-, tri- or poly-cyclic ring system is preferably napthyl, anthracyl, tetracyl, carboxazolyl, indolyl, isoindolyl, indazolyl, indolizidinyl, isoquinolyl, quinazolyl or quinolyl, preferably, antracyl, tetracyl or carboxazolyl. Optionally the rings or fused rings may be linked to form a conjugated system or a larger aromatic ring (for example an aromatic macrocycle, such as a porphyrin).

The aromatic ring-containing monomeric units may be linked:
a) by covalent bonds directly between aromatic rings; or
b) by a cross-linking moiety between aromatic rings, optionally wherein the cross-linking moiety is an aliphatic group, optionally an alkylene group (for example a methylene group).

The aromatic ring-containing monomeric units and/or monomers of the invention may be spatially expanded molecules with multiple aromatic rings. These aromatic rings may be separated from one another within the molecule itself. At least two of these aromatic rings may be disposed peripherally. At least two of these aromatic rings may form at least a portion of a perimeter of the monomers or monomer units. The perimeter of the monomers or monomeric units may entirely be defined by these aromatic rings. At least two of these aromatic rings may be connected to the remainder of the monomers or monomer units by a single covalent bond. These monomers are selected such that they do not exhibit a tendency to pack. These features, alone or in combination with the multiple possible reaction sites present on each aromatic ring, lead to an intrinsic predisposition, and subsequent tendency, for the monomers to branch and spatially develop into a porous cross-linked polymeric network. At least a subset of the aromatic ring-containing monomeric units may comprise two aromatic rings:

a) having a spatial separation from one another (e.g. as measured from the respective centres) of at least 0.2 nm, optionally at least 0.3 nm, optionally at least 0.4 nm, optionally at least 0.5 nm or optionally at least 0.6 nm, wherein the spatial separation is measured from the centers of these aromatic rings; and/or b) separated from one another by 4 or more bonds.

With reference to any arbitrarily selected atom (for example a carbon atom, silicon atom; or nitrogen atom) comprised in the aromatic ring-containing monomers or monomer units, the aromatic ring-containing monomers or monomer units may comprise a group of aromatic rings that share said atom or are directly connected thereto. This group may comprise up to three such aromatic rings irrespective of the reference atom chosen. This group may comprise up to two such aromatic rings irrespective of the reference atom chosen.

The aromatic ring-containing monomeric units may be derived from aromatic ring-containing monomers each comprising at least one aromatic ring that is free to rotate in relation to the rest of the monomer. This may for example be achieved when an aromatic ring is connected to the rest of the monomer or monomer unit by a single covalent bond. These freely-rotating aromatic rings serve as attachment points for cross-linking to other monomeric units within the cross-linked polymer. The fact that they are free to rotate out of the plane with respect to the rest of the monomer or monomeric unit and/or with respect to one or more other aromatic rings of the monomer or monomer unit (i.e. they may be orthogonal to the vicinal moieties) may maximize the chance that these aromatic rings may cross-link with other monomers or monomeric units.

At least a subset of the aromatic ring-containing monomeric units may be selected from the group consisting of:

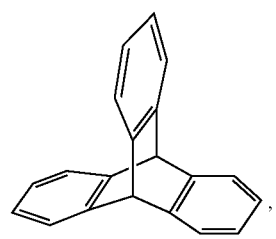

(1)

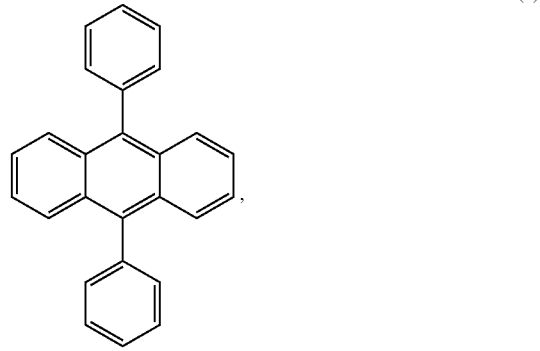

(2)

(3)
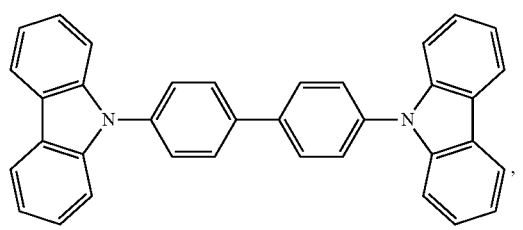
(4)
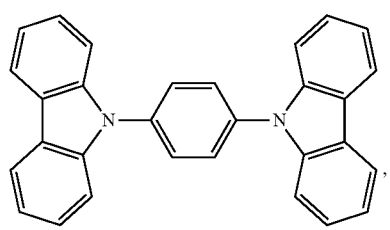
(5)
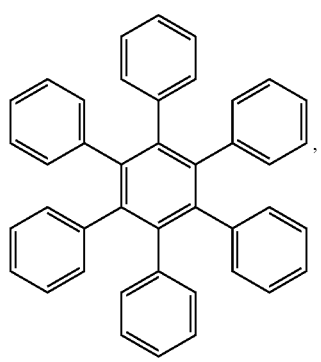
(6)
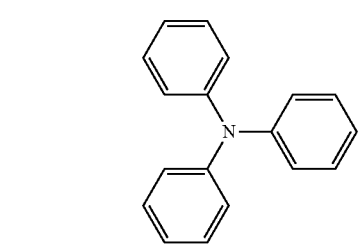
(7)
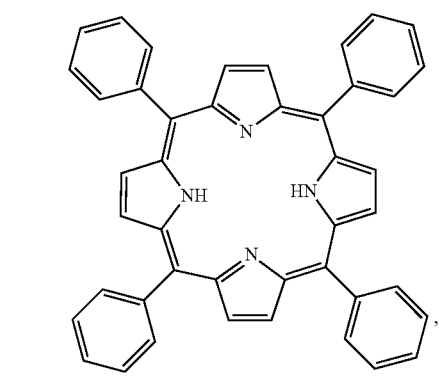
(8)
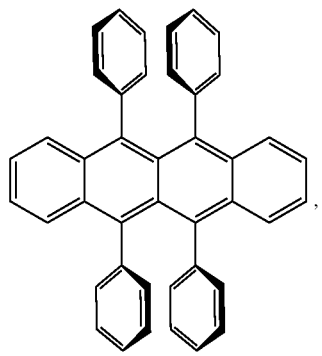
(9)
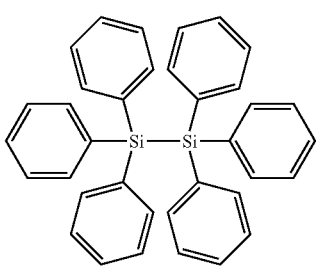
(10)
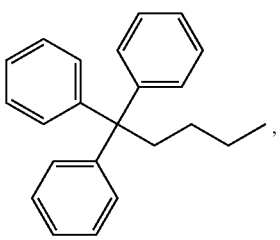
(11)
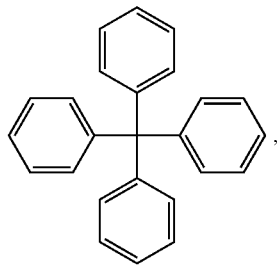
(12)
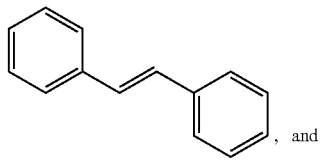, and
(13)
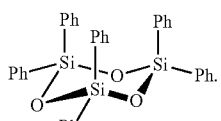
Exemplary cross-linked polymeric frameworks according to the invention include, without limitation: homopolymers of monomeric units (3), (4), (7) or (10) linked by covalent bonds directly between aromatic rings; homopolymers of monomeric units (1), (2), (3), (5), (8), (9), (12) or (13) linked by an alkylene linker (preferably a methylene linker)

between aromatic rings; and copolymers of (6) and (11), or (7) and (11), optionally linked by covalent bonds directly between aromatic rings.

In any of the aspects or embodiments of the invention discussed herein, the aromatic ring containing monomers or monomeric units may contain no alkene group. Optionally, the aromatic ring containing monomers or monomeric units are not diphenylethene, triphenylethene or tetraphenylethene.

The gas storage material may be an amorphous material. The tertiary structure of the cross-linked polymeric framework does not form a regular crystalline structure.

The BET specific surface area of the gas storage material may be greater than about 750 $m^2g^{-1}$, optionally greater than about 850 $m^2g^{-1}$, optionally greater than about 1000 $m^2g^{-1}$, optionally greater than about 1250 $m^2g^{-1}$, optionally greater than about 1500 $m^2g^{-1}$, optionally greater than about 2000 $m^2g^{-1}$, optionally greater than about 3000 $m^2g^{-1}$, and optionally greater than about 4000 $m^2g^{-1}$. The approximation term "about" refers to +25 $m^2g^{-1}$.

In very preferred embodiments, the pores in the gas storage material may comprise micropores. The gas storage material may comprise micropores of about 1 nm to about 2 nm, optionally about 1.0 to about 1.8 nm, optionally about 1.2 nm to about 1.8 nm.

The total pore volume of the gas storage material may be greater than about 0.40 $cm^3g^{-1}$, optionally greater than about 0.50 $cm^3g^{-1}$, optionally greater than about 0.60 $cm^3g^{-1}$, optionally greater than about 0.90 $cm^3g^{-1}$, optionally greater than about 1.00 $cm^3g^{-1}$, optionally greater than about 0.60 $cm^3g^{-1}$, optionally greater than about 1.20 $cm^3g^{-1}$, optionally greater than about 1.40 $cm^3g^{-1}$, optionally greater than about 1.50 $cm^3g^{-1}$, optionally greater than about 2.00 $cm^3g^{-1}$, optionally greater than about 2.70 $cm^3g^{-1}$, and optionally greater than about 3.00 $cm^3g^{-1}$. The approximation term "about" refers to ±5% of the relevant value.

The ratio between the volume of the micropores and the total pore volume may be greater than about 0.30 $cm^3g^{-1}$, optionally greater than about 0.40 $cm^3g^{-1}$, optionally greater than about 0.50 $cm^3g^{-1}$, optionally greater than about 0.60 $cm^3g^{-1}$, and optionally greater than about 0.70 $cm^3g^{-1}$. An estimate of the term "about" can be about ±8% of the relevant value.

In any of the aspects or embodiments of the invention discussed herein, the cross-linked polymer may be a hyper-cross-linked polymer.

A large variety of highly absorptive materials may be produced according to gas storage material of the invention, using the methods of production given herein. These methods combine the simple use of commercially-available and sometimes cheap non-substituted aromatic molecules, as precursors to a facile procedure. This approach renders conceivable the industrial implementation of the reaction from a laboratory scale to larger and specifically to industrial production.

In a second aspect, the invention provides a method of producing a porous gas storage material, wherein the method comprises:

providing aromatic ring-containing monomers comprising at least two aromatic rings; and subjecting the monomers to a metal-catalyzed cross-coupling reaction;

to form a gas storage material comprising a cross-linked polymeric framework with aromatic ring-containing monomeric units joined directly by covalent bonds between aromatic rings, and comprising a plurality of micropores for gas sorption. The cross coupling may be carried out using nickel or palladium catalysts. The method comprises a nickel-catalyzed cross-coupling reaction, optionally a Yamamoto cross-coupling. The method may be carried out as one step, where the monomers are combined with the cross-coupling reagents to directly form the cross-linked polymer.

As an alternative, the Friedel-Crafts alkylation reaction has been in use for the obtainment of industrial products since more than a century and therefore proved robust and reliable for mass production. This is a pre-requisite for interest in methane and carbon dioxide capture and storage on a large scale. In some methods of the invention, the reaction introduces short methylene ($CH_2$) bridges between monomers. Multiple formations of bridges for each monomer unit result in the construction of the above-described porous and rigid network. These materials and methods provide a suitable wall-to-pore balance for high pressure methane storage. This strategy paves the way for future developments in methane capture and storage.

Accordingly, in a third aspect, the invention provides a method of producing a porous gas storage material, wherein the method comprises:

providing aromatic ring-containing monomers comprising at least two aromatic rings; and cross-linking the monomers by a Friedel-Crafts alkylation reaction;

to form a gas storage material comprising a cross-linked polymeric framework with aromatic ring-containing monomeric units joined by a cross-linking moiety between aromatic rings (optionally an aliphatic group, for example, an alkyl group), and comprising a plurality of pores for gas sorption;

wherein at least a subset of the aromatic ring-containing monomeric units comprises at least five aromatic rings, optionally wherein at least a subset of the aromatic ring-containing monomeric units comprises a carboxazolyl or porphyrin group; or wherein at least a subset of the aromatic ring-containing monomeric units are selected from the group consisting of:

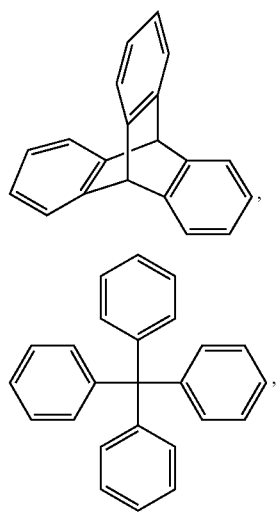

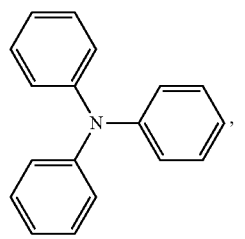
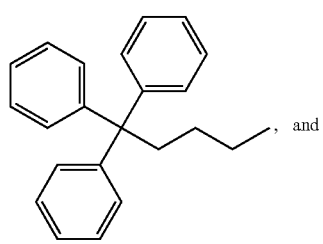, and
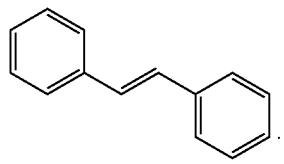.
Optionally at least a subset of the aromatic ring-containing monomeric units are selected from the group consisting of:
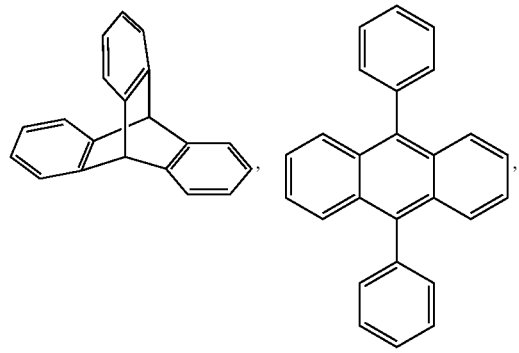
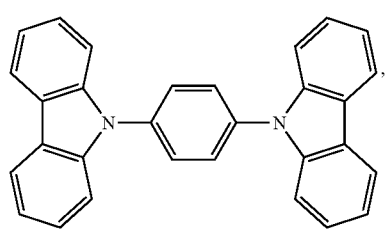
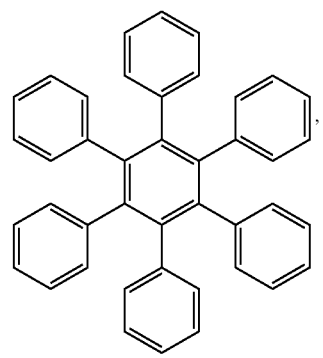,
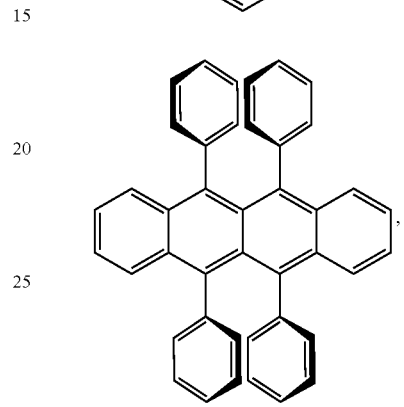,
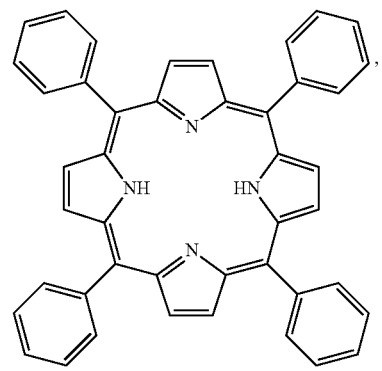,
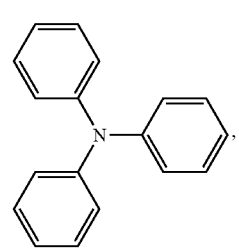,
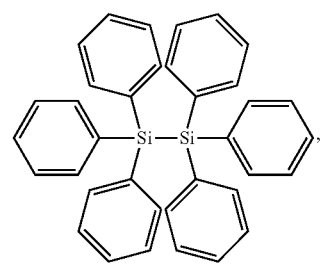, -continued

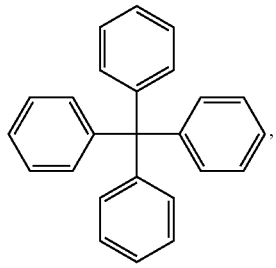,

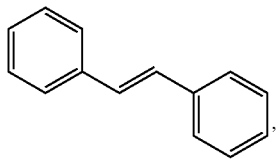,

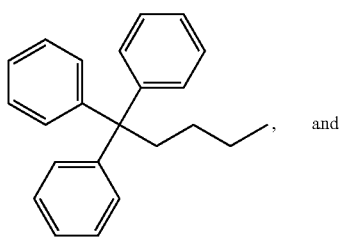, and

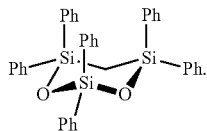

In some embodiments, the cross-linking moiety is a methyl group. Friedel-Crafts alkylation involves the alkylation of an aromatic ring with an alkyl source (the electrophile in the reaction, which forms the cross-linking moiety) using a Lewis acid catalyst (for example $TiCl_4$, $BF_3$, $SnCl_4$, $FeCl_3$ and $AlCl_3$). The alkyl source may be an alkyl halide or an acetal, i.e. an alkyl group substituted with a leaving group). The alkyl source may preferably be difunctionalised, i.e. containing two leaving groups, so it may form a cross-link between two aromatic rings. The method may comprise cross-linking the monomers by a Friedel-Crafts alkylation reaction using formaldehyde dimethyl acetal (FDA) and optionally iron (III) chloride as a catalyst. The method may be carried out as one step, where the monomers are combined with the alkylation reagents to directly form the cross-linked polymer.

In a fourth aspect, the invention provides a porous gas storage material comprising:
a cross-linked polymeric framework; and
a plurality of pores for gas sorption;
wherein the cross-linked polymeric framework comprises aromatic ring-containing monomeric units comprising at least two aromatic rings and wherein the aromatic ring-containing monomeric units are linked by covalent bonds directly between aromatic rings.

In a fifth aspect, the invention provides a porous gas storage material comprising:
a cross-linked polymeric framework; and
a plurality of pores for gas sorption;
wherein the cross-linked polymeric framework comprises aromatic ring-containing monomeric units comprising at least two aromatic rings and wherein the aromatic ring-containing monomeric units are linked by a cross-linking moiety (optionally an aliphatic group, for example, an alkyl group) between aromatic rings and wherein at least a subset of the aromatic ring-containing monomeric units comprises at least five aromatic rings, optionally wherein at least a subset of the aromatic ring-containing monomeric units comprises a carboxazolyl or porphyrin group; or wherein at least a subset of the aromatic ring-containing monomeric units are selected from the group consisting of:

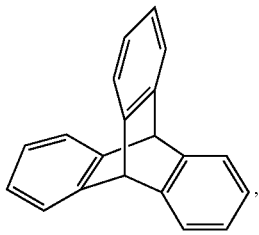,

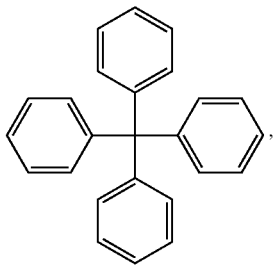,

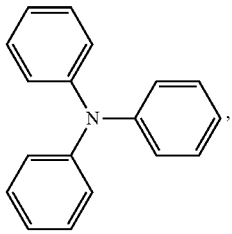,

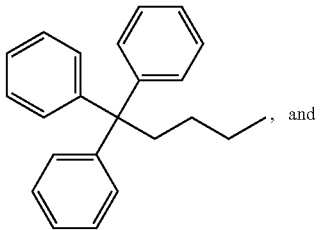, and

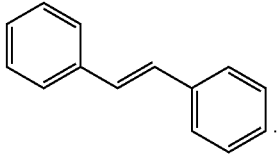.

Optionally at least a subset of the aromatic ring-containing monomeric units are selected from the group consisting of:

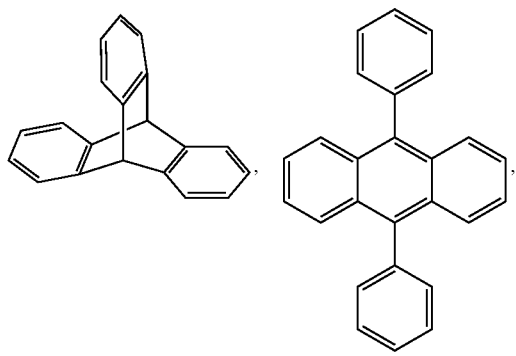
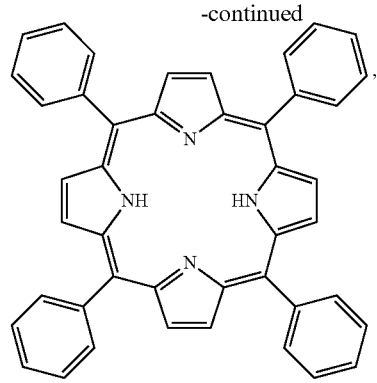
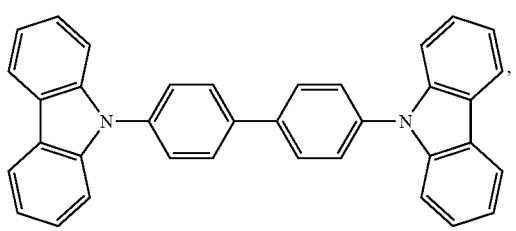
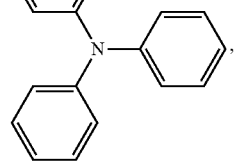
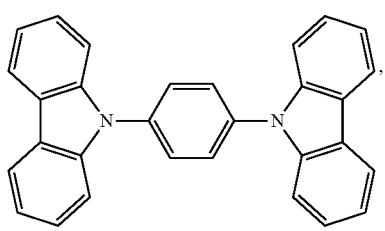
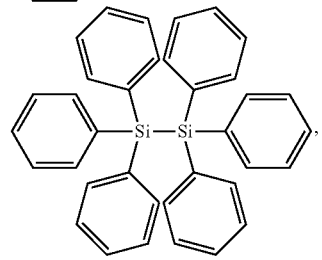
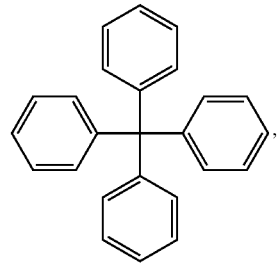
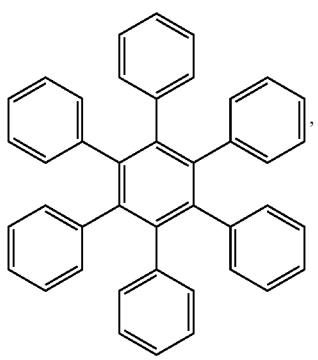
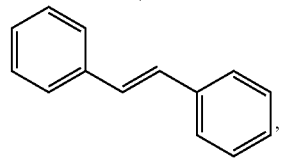
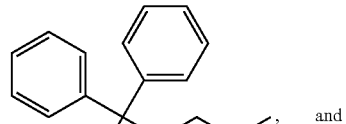
and
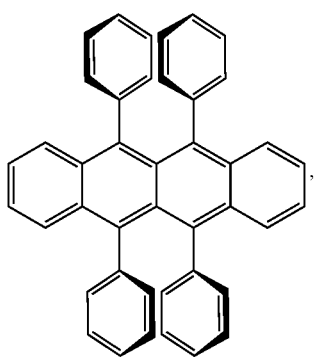
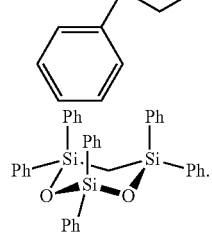
In a sixth aspect, the invention provides a gas storage material as described herein for use in storing gas at a pressure higher than atmospheric pressure. Optionally the gas storage material is for use in storing gas at pressures greater than N bar, wherein N is an integer in the interval 2 bar-180 bar. Optionally, the gas storage material is for use in storing gas at pressures greater than about 15 bar; 35 bar; 40 bar; 80 bar; 100 bar; 120 bar; 150 bar; or 180 bar. The gas may comprise methane, it being optionally compressed natural gas (CNG), it being optionally raw CNG. The gas may comprise $CO_2$ or $NO_2$.

In a seventh aspect, the invention provides the use of a gas storage material as described herein for storing gas at pressures higher than atmospheric pressure. Optionally the use of the gas storage material is for storing gas at a pressure greater than N bar, wherein N is an integer in the interval 2 bar-180 bar. Optionally the gas storage material is for use in storing gas at pressures greater than about 15 bar; 35 bar; 40 bar; 80 bar; 100 bar; 120 bar; 150 bar; or 180 bar. The gas may comprise methane, it being optionally compressed natural gas (CNG), it being optionally raw CNG. The gas may comprise $CO_2$ or $NO_2$.

Embodiments described herein in relation to the first aspect of the invention apply mutatis mutandis to the second to seventh aspects of the invention.

EXAMPLES

Reference is now made to the following examples, which illustrate embodiments of the invention in a non-limiting fashion.

Examples 1 to 20, following, illustrate the synthesis of various embodiments of the cross-linked polymers of the invention from the pre-synthesized aromatic ring-containing monomers. The pre-synthesized aromatic ring-containing monomers can be made by any standard organic synthesis method in the art.

Example 1: Synthesis of MIB-1

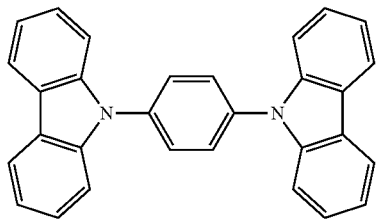

Carbazole Derivative 1

The solution of the catalytic complex was obtained by adding bis(1,5-cyclooctadiene)nickel(0) (Ni(COD)$_2$ (1.2 g, 4.36 mmol, purity 99%) to 2,2'-bipyridyl (1 g, 6.40 mmol, purity ≥99%) and cis,cis-1,5-cyclooctadiene (1 ml, 8.13 mmol, purity ≥98%) dissolved in dimethylformamide (DMF) (200 ml, dried over CaH$_2$) and dry tetrahydrofuran (THF) (50 ml).

The carbazole derivative 1 (4 g) have been subjected to bromination by N-bromosuccinimide (6.0 g) in anhydrous THF for 16 hours at 40° C. The product was washed by dichloromethane and subsequently by methanol. The brominated carbazole derivative (760 mg, 1.05 mmol) was dissolved in dry THF (250 ml) and added dropwise to the catalytic mixture, under nitrogen flow, and the resulting mixture was stirred at 60° C. for 22 hours and at room temperature for 22 hours.

The reaction was then stopped adding concentrated HCl (30 mL) until the solution turned green with a white suspension (~6 hours). After filtration, the residue was washed with THF (2×100 ml), water (2×100 ml) and chloroform (2×100 ml) and dried in vacuum ($10^{-3}$ torr) at 200° C. to achieve an ivory powder (yield: 400 mg).

Example 2: Synthesis of MIB-2

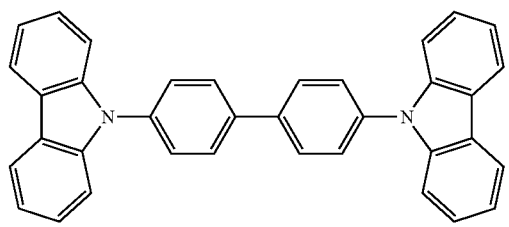

Carbazole derivative 2

The solution of the catalytic complex was obtained by adding bis(1,5-cyclooctadiene)nickel(0) (Ni(COD)$_2$ (2.0 g, 7.27 mmol, purity 99%) to 2,2'-bipyridyl (1 g, 6.40 mmol, purity ≥99%) and cis,cis-1,5-Cyclooctadiene (1 ml, 8.13 mmol, purity ≥98%) dissolved in DMF (300 ml, dried over CaH$_2$) and dry THF (35 ml).

The carbazole derivative 2 (3 g) have been subjected to bromination by N-bromosuccinimide (5.3 g) in anhydrous THF for 16 hours at 40° C. The product was washed by dichloromethane and subsequently by methanol. The brominated carbazol derivative (670 mg, 0.84 mmol, purity 99%) was dissolved in dry THF (165 ml) and added dropwise to the catalytic mixture, under nitrogen flow, and the resulting mixture was stirred at 60° C. for 22 hours and at room temperature for 22 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum ($10^{-3}$ torr) at 200° C. to achieve an ivory powder (yield: 450 mg). Elemental analysis found: H, 4.42, C, 86.51, N, 6.06.

Example 3: Synthesis of MIB-3

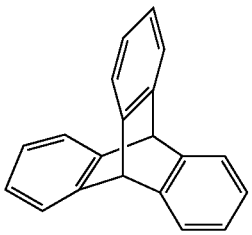

Triptycene (9,10-o-Benzene-9,10-dihydroanthracene)

Formaldehyde dimethyl acetal (FDA) (1.0 ml, 11.79 mmol, 99% purity) and anhydrous FeCl$_3$ (3.83 g, 23.59 mmol) were added to a solution of triptycene (9,10-o-Benzene-9,10-dihydroanthracene, 1 g, 3.93 mmol, 98% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10⁻³ torr) at 130° C. for 15 hours.

Example 4: Synthesis of MIB-4

Formaldehyde dimethyl acetal (FDA) (2.1 ml, 23.59 mmol, 99% purity) and anhydrous FeCl₃ (3.83 g, 23.59 mmol) were added to a solution of triptycene (9,10-o-Benzene-9,10-dihydroanthracene, 1 g, 3.93 mmol, 98% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10⁻³ torr) at 130° C. for 15 hours Elemental analysis found: H, 5.35, C, 83.73.

Example 5: Synthesis of MIB-5

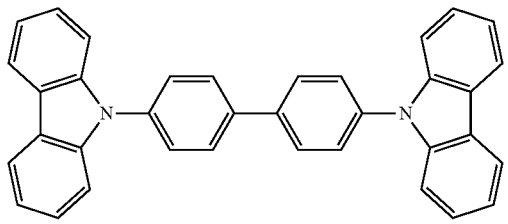

Carbazole derivative 2

Formaldehyde dimethyl acetal (FDA) (1.5 ml, 16.51 mmol, 99% purity) and anhydrous FeCl₃ (2.68 g, 16.51 mmol) were added to a solution of carbazol derivative 2 (1 g, 2.06 mmol, 97% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10⁻³ torr) at 130° C. for 15 hours. Elemental analysis found: H, 4.67, C, 82.31, N, 4.56.

Example 6: Synthesis of MIB-6

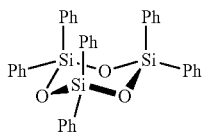

Hexaphenylcyclotrisiloxane

Formaldehyde dimethyl acetal (FDA) (1.8 ml, 20.17 mmol, 99% purity) and anhydrous FeCl₃ (3.27 g, 20.17 mmol) were added to a solution of hexaphenylcyclotrisiloxane (1 g, 1.68 mmol, 99% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10⁻³ torr) at 130° C. for 15 hours. Elemental analysis found: H, 4.33, C, 64.34.

Example 7: Synthesis of MIB-7

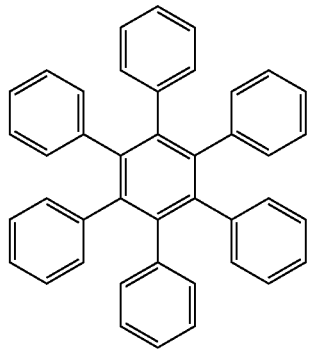

Hexaphenylbenzene

Figure 24:
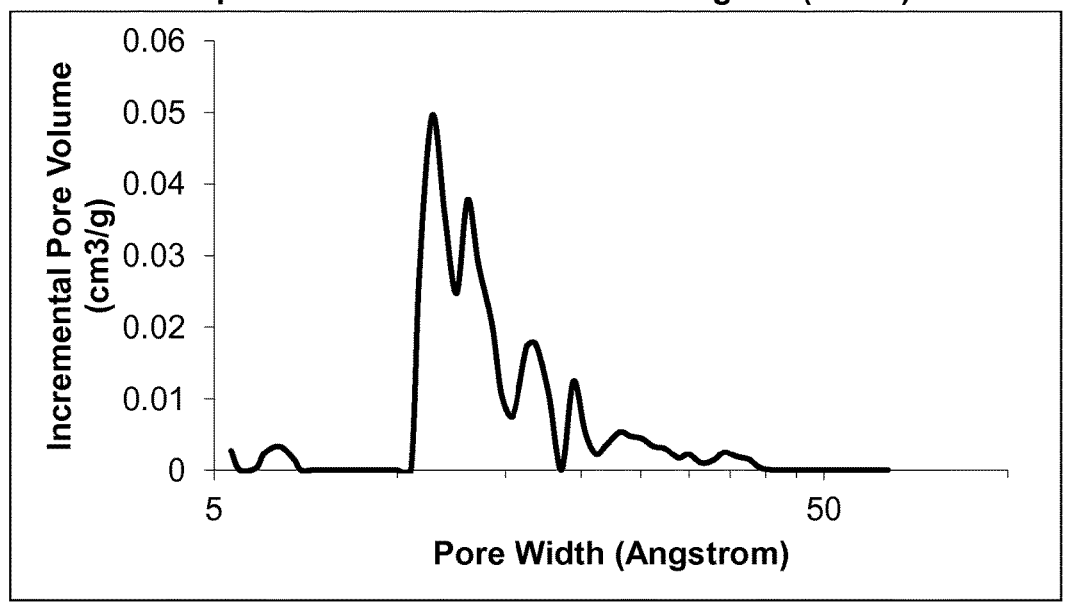

Formaldehyde dimethyl acetal (FDA) (2.0 ml, 22.44 mmol, 99% purity) and anhydrous FeCl₃ (3.640 g, 22.44 mmol) were added to a solution of hexaphenylbenzene (1 g, 1.87 mmol, 98% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10⁻³ torr) at 130° C. for 15 hours. As described above, the pore size of MIB-7 was calculated by non-local DFT applied to the corresponding N2 adsorption isotherm at 77K (shown in FIG. 18). The distribution plot is shown in FIG. 24 and shows a pore size and volume of the gas storage material centered between about 1.1 nm about 1.3 nm.

Example 8: Synthesis of MIB-8

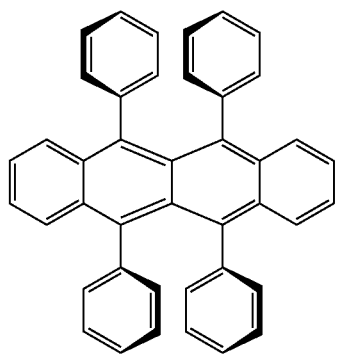

Rubrene (5,6,11,12-tetraphenyltetracene)

Formaldehyde dimethyl acetal (FDA) (1.3 ml, 15.02 mmol, 99% purity) and anhydrous FeCl$_3$ (2.436 g, 15.02 mmol) were added to a solution of rubrene (5,6,11,12-tetraphenyltetracene, 1 g, 1.88 mmol, 97% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10$^{-3}$ torr) at 130° C. for 15 hours.

Example 9: Synthesis of MIB-9

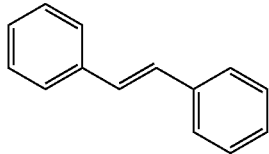

Trans-stilbene

Formaldehyde dimethyl acetal (FDA) (2 ml, 22.19 mmol, 99% purity) and anhydrous FeCl$_3$ (3.60 g, 22.19 mmol) were added to a solution of trans-stilbene (1 g, 5.55 mmol, 96% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10$^{-3}$ torr) at 130° C. for 15 hours.

Example 10: Synthesis of MIB-10

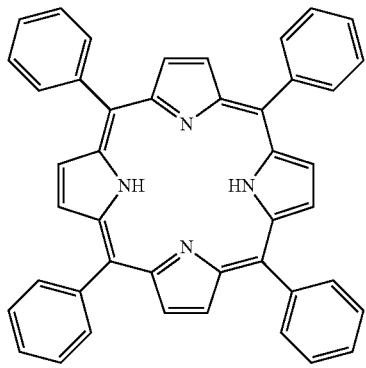

Tetrakisphenyl-porphyrin

The solution of the catalytic complex was obtained by adding bis(1,5-cyclooctadiene)nickel(0) (Ni(COD)$_2$ (1.2 g, 4.36 mmol, purity 99%) to 2,2'-bipyridyl (1 g, 6.40 mmol, purity ≥99%) and cis,cis-1,5-cyclooctadiene (1 ml, 8.13 mmol, purity ≥98%) dissolved in DMF (200 ml, dried over CaH$_2$) and dry THF (50 ml).

Subsequently the brominated porphyrin (5,10,15,20-tetrakis(4-bromophenyl)porphyrin) (800 mg, 0.86 mmol) was dissolved in dry THF (250 ml) and added dropwise to the catalytic mixture under nitrogen flow, and the resulting mixture was stirred at 60° C. for 22 hours and at room temperature for 22 hours. The reaction was then stopped adding concentrated HCl (30 ml) until the solution turned green with a brown suspension (~6 hours).

After filtration, the residue was washed with THF (2×100 ml), water (2×100 ml) and chloroform (2×100 ml) and dried in vacuum (10$^{-3}$ torr) at 200° C. to achieve brown powder. Elemental analysis found: C, 76.85, H, 3.82, N, 8.13.

Example 11: Synthesis of MIB-11

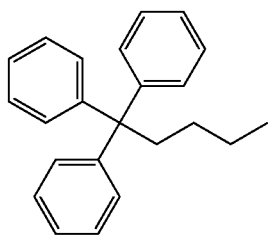

Triphenyl-n-pentane

The solution of the catalytic complex was obtained by adding bis(1,5-cyclooctadiene)nickel(0) (Ni(COD)$_2$ (1.2 g, 4.36 mmol, purity 99%) to 2,2'-bipyridyl (1 g, 6.40 mmol, purity ≥99%) and cis,cis-1,5-cyclooctadiene (1 ml, 8.13 mmol, purity ≥98%) dissolved in DMF (200 ml, dried over CaH$_2$) and dry THF (50 ml).

The triphenyl-n-pentane was added in a flask to elemental bromine (ratio 1:20) at room temperature. After 30 minutes stirring the mixture was quenched with ethanol by a acetone/dry ice bath. The mixture was kept under stirring for 12 hours at room temperature and a saturated solution of NaHSO$_3$ was added. After washing the filtered solid by water, the product was crystallized in chloroform and ethanol.

Subsequently the brominated triphenyl-n-pentane was dissolved in dry THF (250 ml) and added dropwise to the catalytic mixture under nitrogen flow, and the resulting mixture was stirred at 60° C. for 22 hours and at room temperature for 22 hours. The reaction was then stopped adding concentrated HCl (30 ml) for 6 hours. After filtration, the residue was washed with THF (2×100 ml), water (2×100 ml) and chloroform (2×100 ml) and dried in vacuum (10$^{-3}$ torr) at 200° C. to achieve brown powder.

Example 12: Synthesis of MIB-12

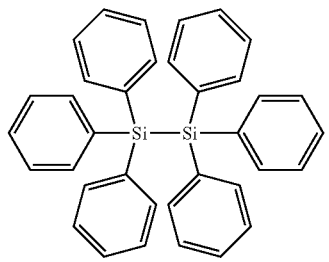

Hexaphenyldisilane

Formaldehyde dimethyl acetal (FDA) (2.0 ml, 23.13 mmol, 99% purity) and anhydrous FeCl$_3$ (3.752 g, 23.13 mmol) were added to a solution of hexaphenyldisilane (1 g, 1.93 mmol, 98% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10$^{-3}$ torr) at 130° C. for 15 hours.

Example 13: Synthesis of MIB-13

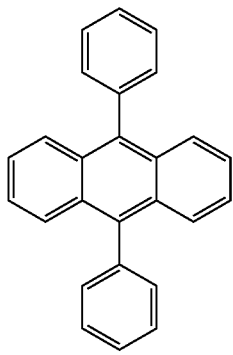

9,10-diphenylanthracene

Formaldehyde dimethyl acetal (FDA) (1.0 ml, 12.10 mmol, 99% purity) and anhydrous FeCl$_3$ (1.964 g, 12.10 mmol) were added to a solution of 9,10-diphenylanthracene (1 g, 3.03 mmol, 97% purity) in 1,2-dichoroethane (20 ml), under inert gas atmosphere (typically, dry nitrogen or argon). The mixture was then stirred at 80° C. for 24 hours in a double-necked flask equipped with a vapor condenser cooled with water. After the reaction, the resulting powder was collected by filtration and then washed with methanol several times, until filtrating liquor was colorless. The product was purified with Soxhlet extraction by boiling methanol for 48 hours and subsequently dried under vacuum (10$^{-3}$ torr) at 130° C. for 15 hours.

Example 14: Synthesis of MIB-N110

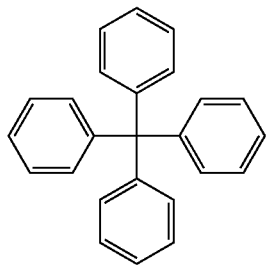

Tetraphenylmethane

-continued

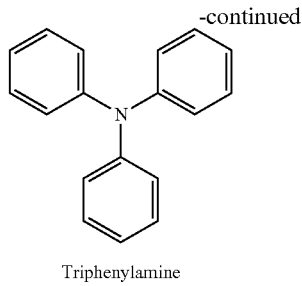

Triphenylamine

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Each monomer was added in a flask to elemental bromine (ratio 1:20) at room temperature. After 30 minutes stirring the mixture was quenched with ethanol by a acetone/dry ice bath. The mixture was kept under stirring for 12 hours at room temperature and a saturated solution of NaHSO$_3$ was added. After washing the filtered solid by water, the product was crystallized in chloroform and ethanol.

Subsequently the tetrakis(4-bromophenyl)methane (346 mg, 0.54 mmol) and tris(4-bromophenyl)amine (29 mg, 0.03 mmol, purity 98%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 mL) until the solution turned green with a white suspension (~6 hours). After filtration, the residue was washed with THF (2×100 ml), water (2×100 ml) and chloroform (2×100 ml) and dried in vacuum (10$^{-3}$ torr) at 150° C. to achieve a light-yellow powder.

Example 15: Synthesis of MIB-N120

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (308 mg, 0.48 mmol) and tris(4-bromophenyl)amine (58 mg, 0.12 mmol, purity 98%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum (10$^{-3}$ torr) at 150° C. to achieve a grey powder.

Example 16: Synthesis of MIB-N130

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (269 mg, 0.42 mmol) and tris(4-bromophenyl)amine (87 mg, 0.18 mmol, purity 98%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum ($10^{-3}$ torr) at 150° C. to achieve a white powder.

Example 17: Synthesis of MIB-N140

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (230 mg, 0.36 mmol) and tris(4-bromophenyl)amine (116 mg, 0.24 mmol, purity 98%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum ($10^{-3}$ torr) at 150° C. to achieve a light-grey powder.

Example 18: Synthesis of MIB-PR20

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (TFMBr, 346 mg, 0.54 mmol) and 5,10,15,20-tetrakis(4-bromophenyl)porphyrin (541 mg, 0.58 mmol, purity 99%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 h). After filtration, the residue was washed with THF (2×100 ml), water (2×100 ml) and chloroform (2×100 ml) and dried in vacuum ($10^{-3}$ torr) at 150° C. to achieve a brow-red powder. Elemental analysis found: H, 3.63, C, 74.55, N, 7.01.

Example 19: Synthesis of MIB-PR50

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (TFMBr, 229 mg, 0.36 mmol) and 5,10,15,20-tetrakis(4-bromophenyl)porphyrin (335 mg, 0.36 mmol, purity 99%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum ($10^{-3}$ torr) at 150° C. to achieve a dark brown powder. Elemental analysis H, 4.46, C, 83.28, N, 5.62.

Example 20: Synthesis of MIB-PR80

The solution of the catalytic complex was obtained by adding Bis(1,5-cyclooctadiene)nickel(0) (Ni(COD)$_2$, (1.0 g, 3.63 mmol, purity 99%) to 2,2'-bipyridyl (0.5 g, 3.20 mmol, purity ≥99%) and cis,cis-1,5-Cyclooctadiene (0.5 ml, 4.6 mmol, purity ≥98%) dissolved in DMF (180 ml, dried over CaH$_2$) and dry THF (20 ml).

Subsequently tetrakis(4-bromophenyl)methane (370 mg, 0.58 mmol) and 5,10,15,20-tetrakis(4-bromophenyl)porphyrin (135 mg, 0.28 mmol, purity 99%) was dissolved in dry THF (100 ml) and added dropwise to the catalytic mixture, under nitrogen flow, and the resulting mixture was stirred at 0° C. for 48 hours.

The reaction was then stopped adding concentrated HCl (30 ml) until the solution turned green with a white suspension (~6 hours). After filtration, the residue was washed with THF (2×100 ml), water (2×100 ml) and chloroform (2×100 ml) and dried in vacuum ($10^{-3}$ torr) at 150° C. to achieve a brown powder. Elemental analysis found: H, 4.82, C, 87.13, N, 3.15.

Example 21: Calculation of Surface Area and Volume of Porous Gas Storage Material The surface area (m$^2$/g) is calculated from the nitrogen adsorption branch of the nitrogen adsorption isotherm at 77K according to Brunauer-Emmett-Teller (BET) and Langmuir models. The Total Pore volume $V_{tot}$ (cm$^3$/g) is calculated from the nitrogen isotherms at p/p$^0$=0.97. The micropore volume (i.e. the fraction of the total pore volume provided by micropores) was calculated at p/p$^0$=0.1. The ratio between the micropore volume and the total pore volume (which in the tables below is labeled as "Micro/Total Pore Volume") is calculated as the ratio between the above volumes at p/p$^0$=0.1 and p/p$^0$=0.97. The thermal stability is calculated from thermogravimetric analysis and the weight loss is measured at 800° C.

TABLE 1

| | Surface Area (m$^2$/g) | | Total Pore Volume (cm$^3$/g) | Micro/Total Pore Volume | Thermal Stability (° C.) | Weight Loss (%) |
|---|---|---|---|---|---|---|
| | BET | LANGMUIR | | | | |
| MIB-1 | 1622 | 1834 | 1.48 | 0.42 | 550 | 98 |
| MIB-2 | 1698 | 1942 | 1.56 | 0.42 | 550 | 98 |
| MIB-3 | 1628 | 1866 | 1.59 | 0.40 | 500 | 100 |
| MIB-4 | 1592 | 1895 | 1.26 | 0.48 | 500 | 100 |
| MIB-5 | 1090 | 1250 | 0.55 | 0.76 | 450 | 100 |
| MIB-6 | 1054 | 1256 | 0.69 | 0.58 | 450 | 80 |
| MIB-7 | 1082 | 1284 | 0.72 | 0.58 | 450 | 100 |
| MIB-8 | 1258 | 1428 | 0.85 | 0.56 | 500 | 100 |
| MIB-9 | 1254 | 1525 | 0.92 | 0.52 | 500 | 100 |
| MIB-10 | 1494 | 1703 | 1.13 | 0.50 | 400 | 90 |
| MIB-11 | 996 | 1124 | 0.51 | 0.76 | 560 | 100 |
| MIB-12 | 872 | 1004 | 1.15 | 0.32 | 500 | 85 |
| MIB-N110 | 4334 | 5012 | 3.59 | 0.44 | 550 | 100 |

TABLE 1-continued

| | Surface Area (m²/g) | | Total Pore Volume (cm³/g) | Micro/ Total Pore Volume | Thermal Stability (° C.) | Weight Loss (%) |
|---|---|---|---|---|---|---|
| | BET | LANGMUIR | | | | |
| MIB-N120 | 3480 | 4033 | 3.06 | 0.41 | 550 | 100 |
| MIB-N130 | 3407 | 3926 | 2.79 | 0.46 | 550 | 100 |
| MIB-N140 | 2380 | 2722 | 2.21 | 0.41 | 540 | 100 |
| MIB-PR20 | 2194 | 2492 | 2.06 | 0.41 | 400 | 93 |
| MIB-PR50 | 1695 | 1918 | 1.47 | 0.44 | 400 | 91 |
| MIB-PR80 | 918 | 1044 | 0.59 | 0.61 | 400 | 90 |

Table 1 above lists the porous materials by name. In table 2 below, the materials are sorted by descending BET specific surface area ($S_{BET}$):

TABLE 2

| | Surface Area (m²/g) | | Total Pore Volume (cm³/g) | Micro/ Total Pore Volume | Thermal Stability (° C.) | Weight Loss (%) |
|---|---|---|---|---|---|---|
| | BET | LANGMUIR | | | | |
| MIB-N110 | 4334 | 5012 | 3.59 | 0.44 | 550 | 100 |
| MIB-N120 | 3480 | 4033 | 3.06 | 0.41 | 550 | 100 |
| MIB-N130 | 3407 | 3926 | 2.79 | 0.46 | 550 | 100 |
| MIB-N140 | 2380 | 2722 | 2.21 | 0.41 | 540 | 100 |
| MIB-PR20 | 2194 | 2492 | 2.06 | 0.41 | 400 | 93 |
| MIB-2 | 1698 | 1942 | 1.56 | 0.42 | 550 | 98 |
| MIB-PR50 | 1695 | 1918 | 1.47 | 0.44 | 400 | 91 |
| MIB-3 | 1628 | 1866 | 1.59 | 0.40 | 500 | 100 |
| MIB-1 | 1622 | 1834 | 1.48 | 0.42 | 550 | 98 |
| MIB-4 | 1592 | 1895 | 1.26 | 0.48 | 500 | 100 |
| MIB-10 | 1494 | 1703 | 1.13 | 0.50 | 400 | 90 |
| MIB-8 | 1258 | 1428 | 0.85 | 0.56 | 500 | 100 |
| MIB-9 | 1254 | 1525 | 0.92 | 0.52 | 500 | 100 |
| MIB-5 | 1090 | 1250 | 0.55 | 0.76 | 450 | 100 |
| MIB-7 | 1082 | 1284 | 0.72 | 0.58 | 450 | 100 |
| MIB-6 | 1054 | 1256 | 0.69 | 0.58 | 450 | 80 |
| MIB-11 | 996 | 1124 | 0.51 | 0.76 | 560 | 100 |
| MIB-PR80 | 918 | 1044 | 0.59 | 0.61 | 400 | 90 |
| MIB-12 | 872 | 1004 | 1.15 | 0.32 | 500 | 85 |

In table 3 below, the materials are sorted by descending Micro/Total Pore Volume:

TABLE 3

| | Surface Area (m²/g) | | Total Pore Volume (cm³/g) | Micro/ Total Pore Volume | Thermal Stability (° C.) | Weight Loss (%) |
|---|---|---|---|---|---|---|
| | BET | LANGMUIR | | | | |
| MIB-5 | 1090 | 1250 | 0.55 | 0.76 | 450 | 100 |
| MIB-11 | 996 | 1124 | 0.51 | 0.76 | 560 | 100 |
| MIB-PR80 | 918 | 1044 | 0.59 | 0.61 | 400 | 90 |
| MIB-6 | 1054 | 1256 | 0.69 | 0.58 | 450 | 80 |
| MIB-7 | 1082 | 1284 | 0.72 | 0.58 | 450 | 100 |
| MIB-8 | 1258 | 1428 | 0.85 | 0.56 | 500 | 100 |
| MIB-9 | 1254 | 1525 | 0.92 | 0.52 | 500 | 100 |
| MIB-10 | 1494 | 1703 | 1.13 | 0.50 | 400 | 90 |
| MIB-4 | 1592 | 1895 | 1.26 | 0.48 | 500 | 100 |
| MIB-N130 | 3407 | 3926 | 2.79 | 0.46 | 550 | 100 |
| MIB-N110 | 4334 | 5012 | 3.59 | 0.44 | 550 | 100 |
| MIB-PR50 | 1695 | 1918 | 1.47 | 0.44 | 400 | 91 |
| MIB-1 | 1622 | 1834 | 1.48 | 0.42 | 550 | 98 |
| MIB-2 | 1698 | 1942 | 1.56 | 0.42 | 550 | 98 |
| MIB-N140 | 2380 | 2722 | 2.21 | 0.41 | 540 | 100 |
| MIB-PR20 | 2194 | 2492 | 2.06 | 0.41 | 400 | 93 |
| MIB-N120 | 3480 | 4033 | 3.06 | 0.41 | 550 | 100 |
| MIB-3 | 1628 | 1866 | 1.59 | 0.40 | 500 | 100 |
| MIB-12 | 872 | 1004 | 1.15 | 0.32 | 500 | 85 |

In table 4 below, the materials are sorted by descending Total Pore Volume:

TABLE 4

| | Surface Area (m²/g) | | Total Pore Volume (cm³/g) | Micro/ Total Pore Volume | Thermal Stability (° C.) | Weight Loss (%) |
|---|---|---|---|---|---|---|
| | BET | LANGMUIR | | | | |
| MIB-N110 | 4334 | 5012 | 3.59 | 0.44 | 550 | 100 |
| MIB-N120 | 3480 | 4033 | 3.06 | 0.41 | 550 | 100 |
| MIB-N130 | 3407 | 3926 | 2.79 | 0.46 | 550 | 100 |
| MIB-N140 | 2380 | 2722 | 2.21 | 0.41 | 540 | 100 |
| MIB-PR20 | 2194 | 2492 | 2.06 | 0.41 | 400 | 93 |
| MIB-3 | 1628 | 1866 | 1.59 | 0.40 | 500 | 100 |
| MIB-2 | 1698 | 1942 | 1.56 | 0.42 | 550 | 98 |
| MIB-1 | 1622 | 1834 | 1.48 | 0.42 | 550 | 98 |
| MIB-PR50 | 1695 | 1918 | 1.47 | 0.44 | 400 | 91 |
| MIB-4 | 1592 | 1895 | 1.26 | 0.48 | 500 | 100 |
| MIB-12 | 872 | 1004 | 1.15 | 0.32 | 500 | 85 |
| MIB-10 | 1494 | 1703 | 1.13 | 0.50 | 400 | 90 |
| MIB-9 | 1254 | 1525 | 0.92 | 0.52 | 500 | 100 |
| MIB-8 | 1258 | 1428 | 0.85 | 0.56 | 500 | 100 |
| MIB-7 | 1082 | 1284 | 0.72 | 0.58 | 450 | 100 |
| MIB-6 | 1054 | 1256 | 0.69 | 0.58 | 450 | 80 |
| MIB-PR80 | 918 | 1044 | 0.59 | 0.61 | 400 | 90 |
| MIB-5 | 1090 | 1250 | 0.55 | 0.76 | 450 | 100 |
| MIB-11 | 996 | 1124 | 0.51 | 0.76 | 560 | 100 |

Example 23: Methane Sorption Measurements Up to 180 Bar

Methane sorption measurements at high pressure are performed to test the maximum gas capacity and to determine the isotherm profile from low to high pressures, i.e. in a wider range than previously achieved in the prior art. This can yield the 'deliverable gas' potential of the materials.

To perform the experiments a Micromeritics HPVA II (High Pressure Volumetric Apparatus), equipped with a pressure-booster compressor was used. The booster provides to compress the gas from the gas cylinder up to 200 bar.

Samples were loaded in a 10 ml-steel jar and connected to the instrument by a VCR connection with a 10 μm seal-frit gasket to avoid sample dispersion into the manifold volume.

Before the analysis, the samples were activated overnight at 130° C. under vacuum, directly in the steel jar.

Each experiment was performed by applying an adsorption-desorption cycle up to 180 bar at 25° C. The temperature is controlled using a Julabo F12-ED refrigerated/heating circulator connected with the HPVA circulation Dewar. The free-space volume was measured with helium just before the first run and then inserted manually during experiment elaboration.

To avoid errors due to sample contamination between the de-gassing and the measurement stage, the sample mass was measured after the analysis.

After the experiment, a blank-correction is applied to the isotherm. The blank experiment is obtained by a point-by-point method on five cycles performed with the empty jar.

The as-obtained isotherms are "excess" isotherms, i.e. the excess gas amount that is "adsorbed" by the sample due to their active pore-surfaces. At pressures over 10 bar, the gas density grows over the ideal gas range and this must be taken into account in the experiment elaboration. To obtain the "total" absorbed amount ($n_{tot}$) we must consider the total pore volume of the sample ($V_p$) and the ratio between the volume of the ideal gas and the volume occupied by the same amount at a certain pressure (p(P)) following the relationship:

$$n_{tot}(P) = n_{ex}(P) + V_p \cdot \rho(P)$$

In this elaboration, to obtain the function p(P) methane density values in a pressure range between 0.5 and 200 bar are fitted with a polynomial function and, then, they are calculated point by point using the pressure of each analysis point. Density values are obtained by REFPROP software of NIST database.

The methane sorption isotherms of MIB-1, MIB-2, MIB-4, MIB-5, MIB-6, MIB-7, MIB-8, MIB-9, MIB-10, MIB-12 and MIB-PR20 are shown in FIGS. 1 to 11, respectively. The desorption branches virtually overlap with the absorption branches. The designation "Vads/g (cm$^3$ STP/g)" of FIGS. 1 to 11 is equivalent to "Quantity adsorbed (cm$^3$/g STP)" of FIGS. 12 to 23, each indicating the measured volumes of adsorbed gas at standard conditions of temperature and pressure.

After the present demonstration of the high-pressure performance of the novel materials, it becomes conceivable that a large number of molecules containing benzene rings and other aromatic rings can be suitable as precursors to form effective nanoporous materials which operate for loading up to high pressures of methane and carbon dioxide, by either the Friedel-Crafts or the Cross-Coupling Synthesis (e.g. Yamamoto-type catalysis) methods. Acetylene moieties could also be inserted as structure extenders, for instance, to achieve better performances. In other examples fluorinated compounds could be used to induce a modulated uptake from high to low pressures.

The aromatic ring-containing monomers used for the synthesis of the materials described herein could be defined as 'Shape-Persistent Networks (SPN)'. This relates to the retention of shape of the monomer when inserted in the network and with stability upon mechanical compression. This was demonstrated experimentally by mechanically loading the materials under a piston (several tons/cm$^3$) prior to performing the uptake experiments at increasing gas pressures. The materials underwent mechanical compression up to several ton/cm$^3$ in order to increase their densities by eliminating at least part of any potentially present interstices, and the adsorption isotherms were repeated after the compression. The results were comparable to the original isotherms, and an uptake efficiency reduction of at most 8-12% was measured. This conveys the idea that the monomeric units cannot pack efficiently owing to their intrinsic shape factor. A tendency to pack would have resulted into reductions of efficiency of much more that the above values. The alkyl bridging used to cross-link the monomers increases, optimizes or tunes the porosity to required levels by creating a rigid cross-linked polymeric framework (preferably a hypercross-linked polymeric framework). In principle, however, the aromatic ring-containing monomers would absorb methane even without the creation of bridges between the building blocks.

In other words, the aromatic ring-containing monomers which compose the cross-linked polymeric framework were designed with a suitable shape, which hinders a favorable association to a next neighbour. This principle was applied systematically to prevent aggregation among molecular precursors during the formation of the framework: the carbon-carbon bond formation (or alkyl bridging, such as CH$_2$) immobilizes and imparts rigidity to the molecular building-blocks in such an ill-packed arrangement. To avoid the collapse of the structure into a more compact arrangement by conformational relaxation, aromatic ring-containing monomeric units having a suitable structural rigidity were adopted. The aromatic ring-containing monomers contain multiple aromatic rings (especially the six member rings typical of benzene and derivatives). These are endowed with exceptional stability and contain such an electron density that promotes interaction with methane hydrogen atoms and positively charged carbon atoms of CO$_2$. The multiple reaction sites on the aromatic rings provided further tendency to 3D branching and spatial development of the architecture.

Embodiments of the invention have been described by way of example only. It will be appreciated that variations of the described embodiments may be made which are still within the scope of the invention. In particular, applications involving gases other than methane or carbon dioxide-comprising gases are possible in as far as the molecules of the adsorbate gas can, due to their dimensions, enter the pores of the absorbent material. Applications other than marine CNG are also possible. In particular, reference is made to automotive CNG, domestic CNG and to applications involving portable devices for storage of gas such as portable lighters, such as cigarette lighters, fire extinguishers, and diving equipment.

The invention claimed is:

1. A method of storing gas, the method comprising:

providing a recipient for receiving the gas;

providing a porous gas storage material, the gas storage material comprising:

a cross-linked polymeric framework; and a plurality of pores for gas sorption;

wherein the cross-linked polymeric framework comprises aromatic ring-containing monomeric units comprising at least two aromatic rings selected from the group consisting of:

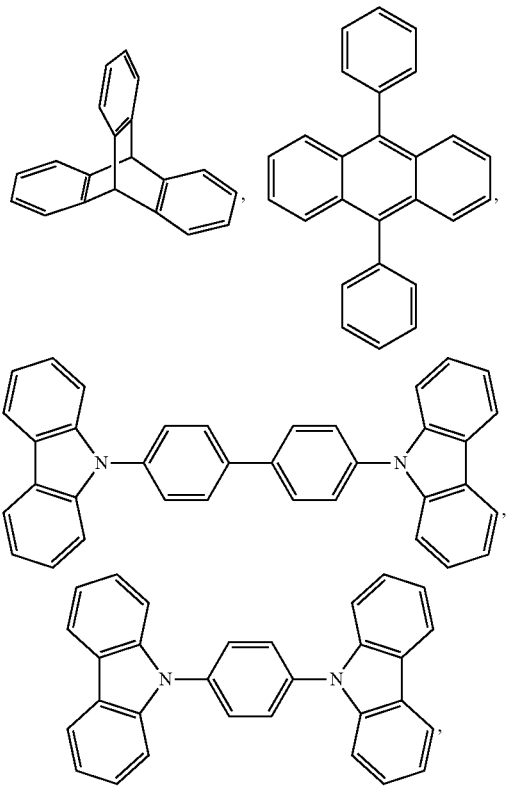

-continued

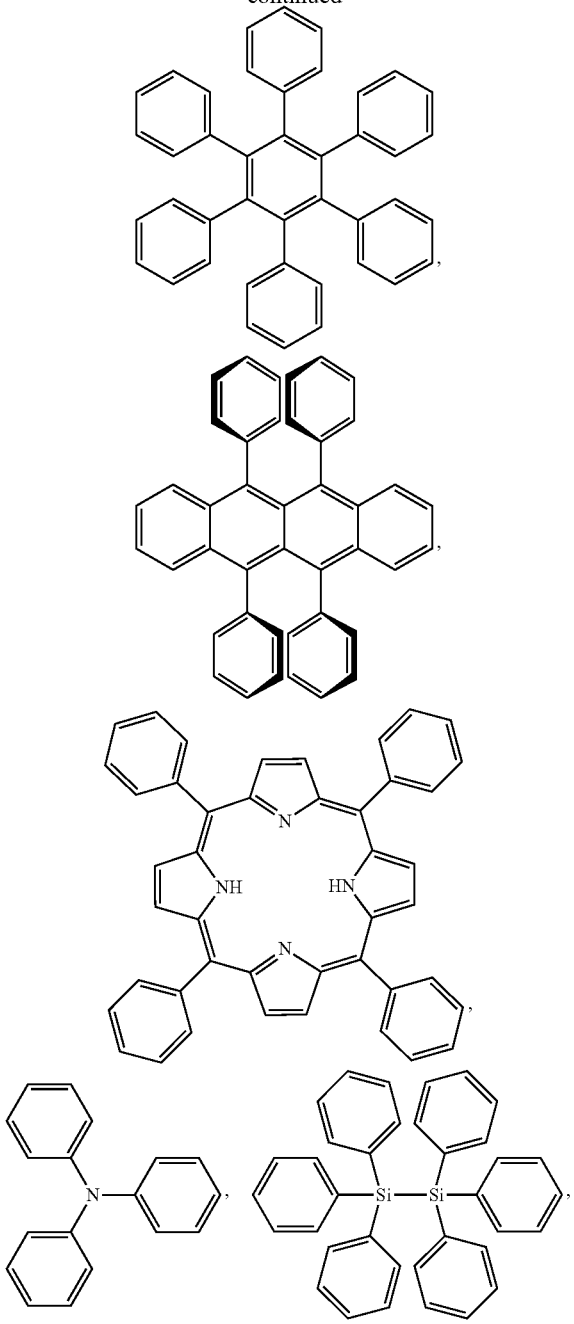

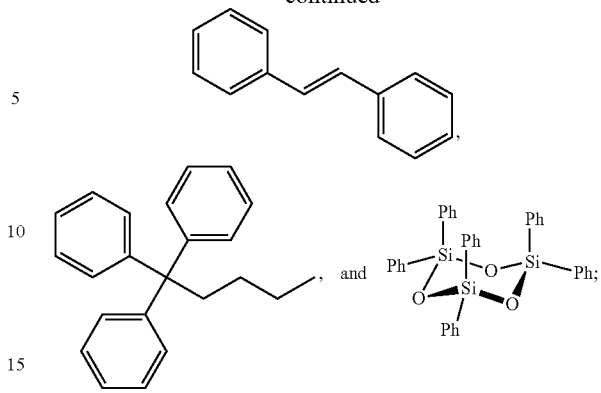

and wherein the aromatic ring-containing monomeric units are linked by covalent cross-linking between aromatic rings; and loading the recipient with the gas;

the recipient being designed to sustain a nominal maximum internal pressure P1 greater than atmospheric pressure;

the porous gas storage material being disposed within said recipient; and loading the recipient with the gas to a pressure P2 equal to or lower than P1.

2. The method of claim 1, wherein P2 is greater than N bar, wherein N is an integer in the interval 2-180.

3. The method of claim 1, wherein P1 is greater than M bar, wherein M is an integer equal to 5, or a multiple thereof, in the interval 10-250.

4. The method of claim 1, wherein the gas comprises methane, it being optionally compressed natural gas (CNG), it being optionally raw CNG.

5. The method of claim 4, wherein the recipient is a pressure vessel designed to store, or store and transport, the CNG, it being optionally for marine storage, or storage and transportation, of the CNG onboard a water-going naval craft.

6. The method of claim 5, wherein the pressure vessel comprises a load-bearing structural portion comprising a composite material.

7. The method of claim 5, wherein the pressure vessel comprises a load-bearing structural portion comprising a filamentous composite material.

* * * * *